US010313023B2

(12) United States Patent
Paraiso et al.

(10) Patent No.: US 10,313,023 B2
(45) Date of Patent: Jun. 4, 2019

(54) QUANTUM COMMUNICATION COMPONENT, RECEIVER AND SYSTEM

(71) Applicant: Kabushiki Kaisha Toshiba, Minato-ku (JP)

(72) Inventors: Taofiq Paraiso, Cambridge (GB); Marco Lucamarini, Cambridge (GB); Zhiliang Yuan, Cambridge (GB); Andrew James Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/903,574

(22) Filed: Feb. 23, 2018

(65) Prior Publication Data

US 2019/0013878 A1   Jan. 10, 2019

(30) Foreign Application Priority Data

Jul. 10, 2017 (GB) .................................. 1711096.6

(51) Int. Cl.
*H04B 10/70* (2013.01)
*G02F 1/225* (2006.01)
*G02B 6/12* (2006.01)
(Continued)

(52) U.S. Cl.
CPC ......... *H04B 10/70* (2013.01); *G02B 6/12002* (2013.01); *G02B 6/12004* (2013.01);
(Continued)

(58) Field of Classification Search
CPC ............ G02B 6/12002; G02B 6/12004; G02B 6/12007; G02B 6/13; G02B 6/131;
(Continued)

(56) References Cited

U.S. PATENT DOCUMENTS 7,068,881 B2 * 6/2006 Yoo ..................... G02B 6/12004
385/24
8,374,350 B2 * 2/2013 Yuan ..................... H04B 10/70
375/144

FOREIGN PATENT DOCUMENTS

JP     2006-345354     12/2006
JP     2008-270873     11/2008
(Continued)

OTHER PUBLICATIONS

British Examination Search Report dated Jan. 8, 2018 in British application GB 1711096.6, filed on Jul. 10, 2017.
(Continued)

*Primary Examiner* — Michael P Mooney
(74) *Attorney, Agent, or Firm* — Oblon, McClelland, Maier & Neustadt, L.L.P.

(57) ABSTRACT

A component for a quantum communication system, the component comprising:
  an input section and a decoder section,
  the input section comprising n waveguides, where n is an integer of at least 2,
  the decoder section comprising m decoders, where m is an integer of at least 2, each decoder comprising at least one waveguide,
  the input section and the decoder section being provided on a single substrate such that the waveguides are continuous and integrated between the input section and the decoder section,
  the waveguides of the input section and the decoder section being arranged such that light pulses enter the waveguides of the decoder section via the waveguides of the input section and the m decoders operate in parallel.

19 Claims, 22 Drawing Sheets

(51) Int. Cl.
 G02B 6/13 (2006.01)
 G02F 1/21 (2006.01)
(52) U.S. Cl.
 CPC .......... *G02B 6/12007* (2013.01); *G02B 6/13* (2013.01); *G02F 1/225* (2013.01); *G02F 2001/212* (2013.01); *G02F 2201/06* (2013.01); *G02F 2201/14* (2013.01); *G02F 2201/58* (2013.01); *G02F 2203/50* (2013.01)
(58) Field of Classification Search
 CPC ........ G02B 6/132; G02B 6/134; G02B 6/136; G02F 1/225; G02F 2001/212; G02F 2201/06; G02F 2203/50; H04B 10/70
 USPC ... 385/3, 8–10, 14, 24, 31, 39–43, 129–132; 398/25, 40, 140, 141; 380/255, 256, 277, 380/278, 31; 375/144, 145, 149, 329, 375/353, 355
 See application file for complete search history.

(56) References Cited

FOREIGN PATENT DOCUMENTS

| JP | 2009-17277 | 1/2009 |
| WO | WO 2007/105834 A1 | 9/2007 |
| WO | WO 2016/142701 A1 | 9/2016 |

OTHER PUBLICATIONS

Japanese Office Action dated Feb. 19, 2019 in Japanese Patent Application No. 2018-024960 w/English Translation, citing AO, AP and AX. 25 pages.

Korzh et al., "A High-Speed Multi-Protocol Quantum Key Distrubution Transmitter based on a Dual-Drive Modulator," published Aug. 13, 2013. 14 pages.

* cited by examiner

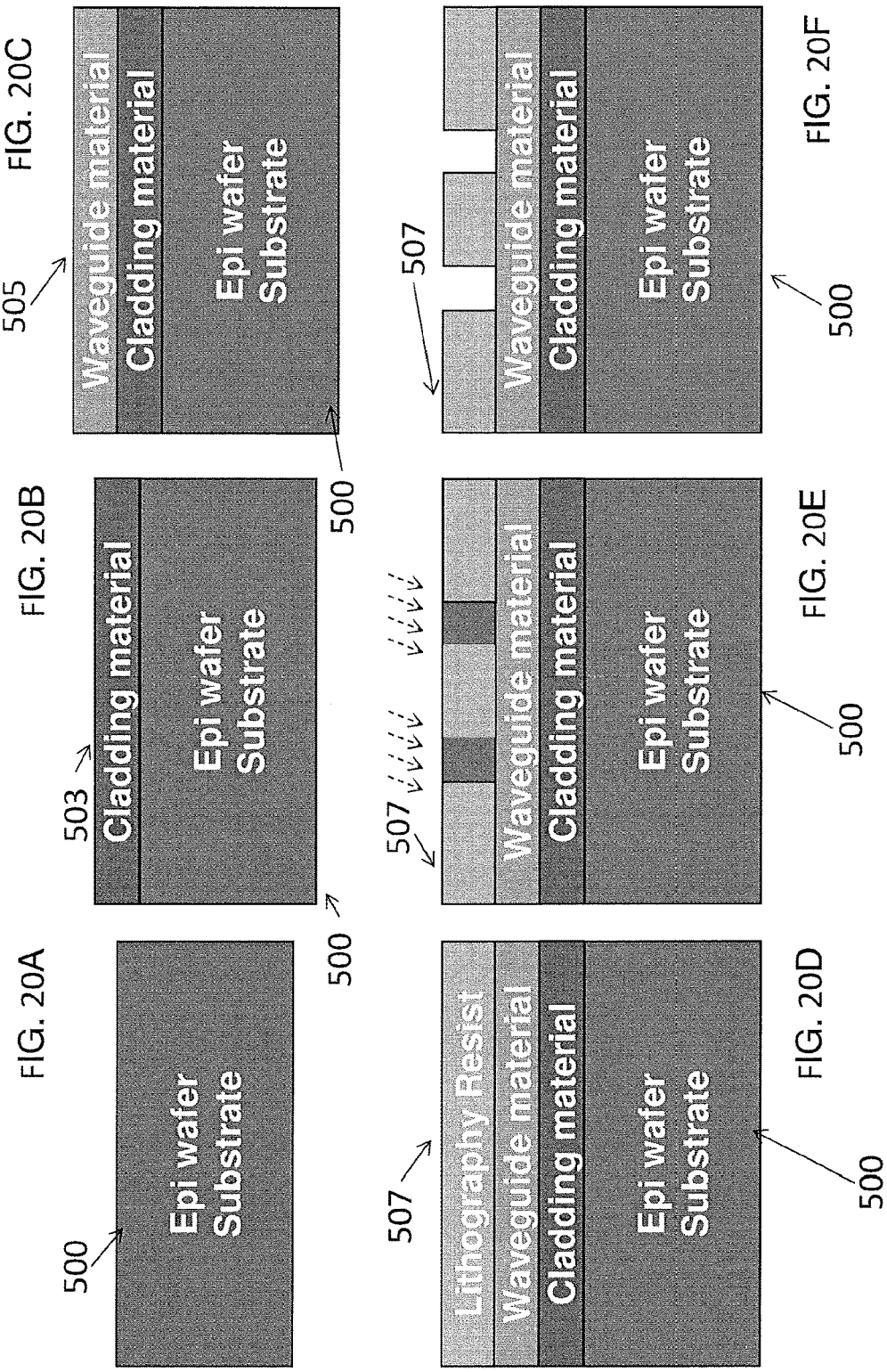

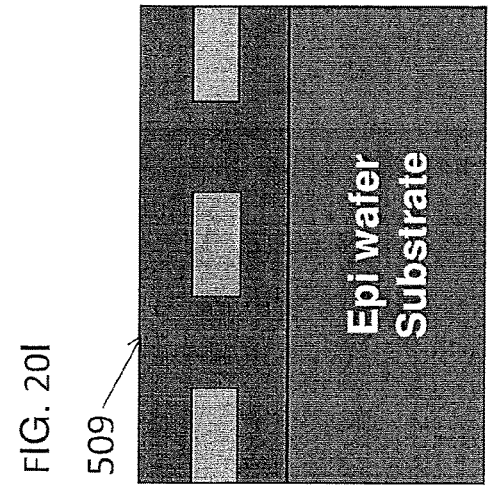
FIG. 20G
FIG. 20H
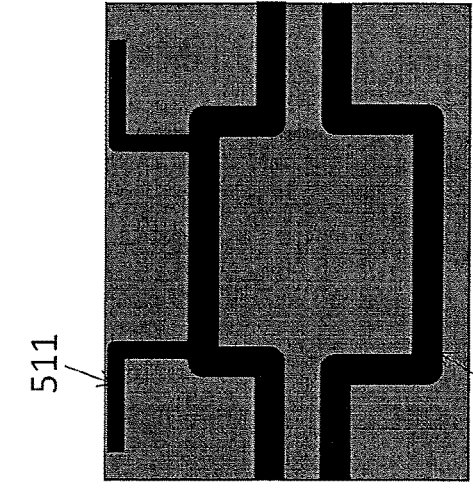
FIG. 20I
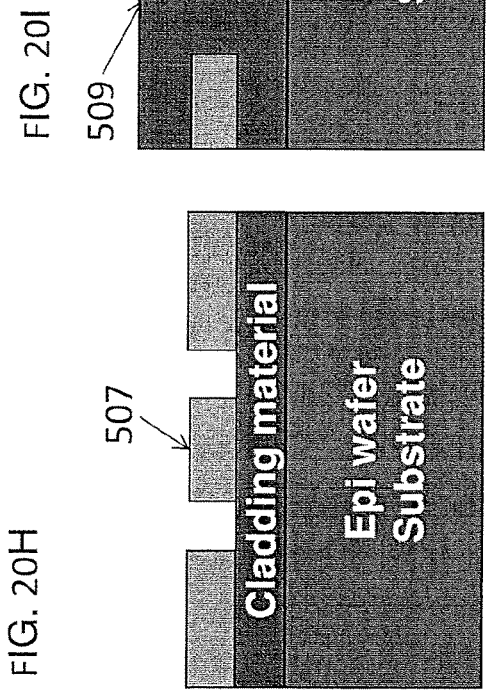
FIG. 20J
FIG. 20K
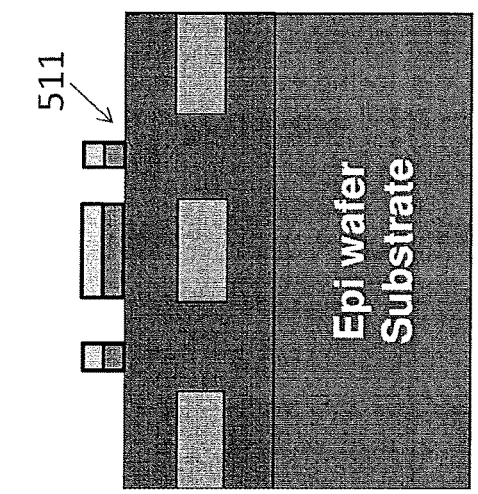
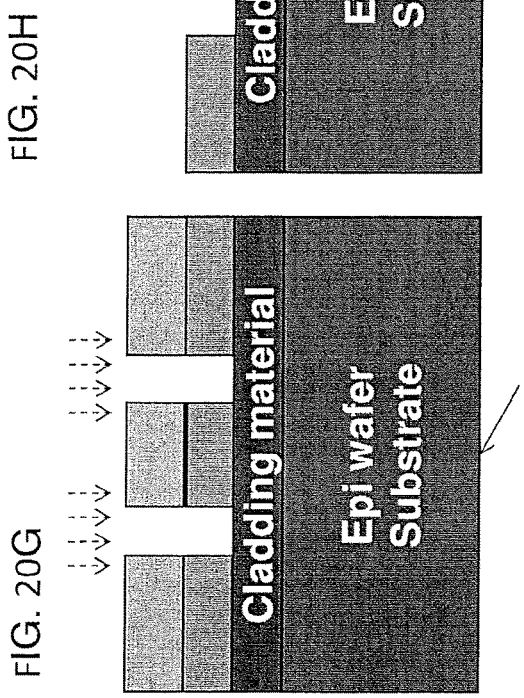
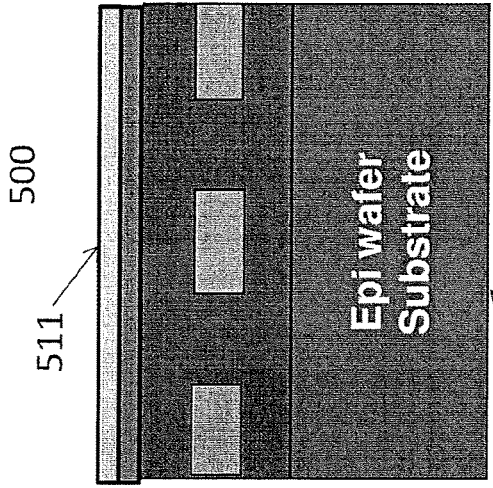
Figure 20L

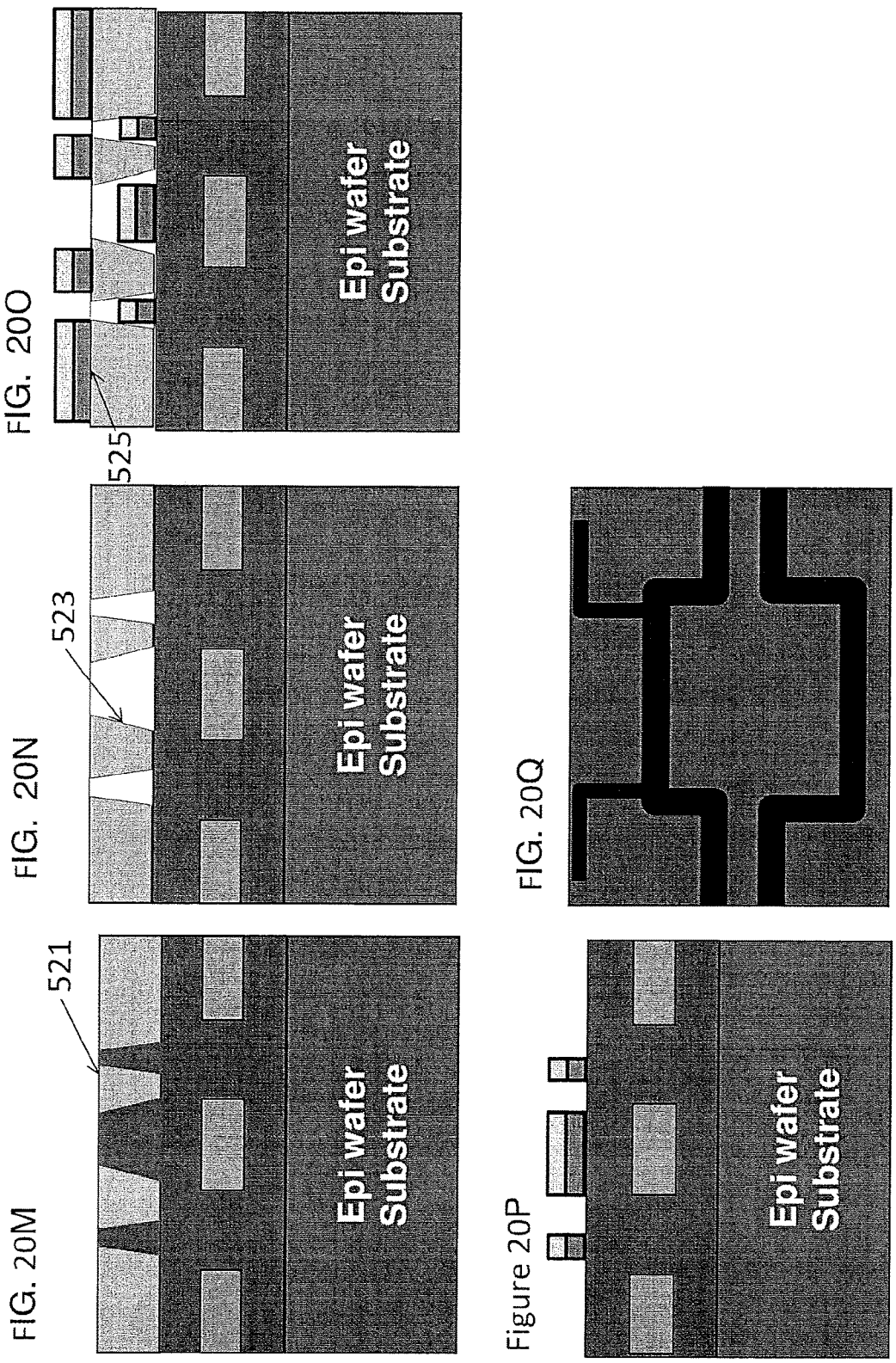

QUANTUM COMMUNICATION COMPONENT, RECEIVER AND SYSTEM

FIELD

Embodiments described herein relate generally to quantum communication systems.

BACKGROUND

In a quantum communication system, information is sent between a transmitter and a receiver by encoded single quanta, such as single photons. Each photon carries one bit of information encoded upon a property of the photon, such as its polarization, phase, time or energy. The photon may even carry more than one bit of information, for example, by using properties such as angular momentum.

Quantum key distribution (QKD) is a technique that results in the sharing of cryptographic keys between two parties: a transmitter often referred to as "Alice"; and a receiver often referred to as "Bob". The attraction of this technique is that it allows to quantify the maximum information potentially known to an unauthorised eavesdropper, often referred to as "Eve". In many forms of QKD, Alice and Bob use two or more non-orthogonal bases in which to encode the bit values. These bases are kept secret during the quantum communication and are disclosed in a public discussion only after all the measurements have been completed by Bob. The laws of quantum mechanics dictate that measurement of the photons by Eve without prior knowledge of the encoding basis causes an unavoidable change to the quantum state of some of the photons.

BRIEF LIST OF FIGURES

FIGS. 20A to 20Q show flow diagrams for fabricating a component in accordance with an embodiment.

DETAILED DESCRIPTION

Figure 1:
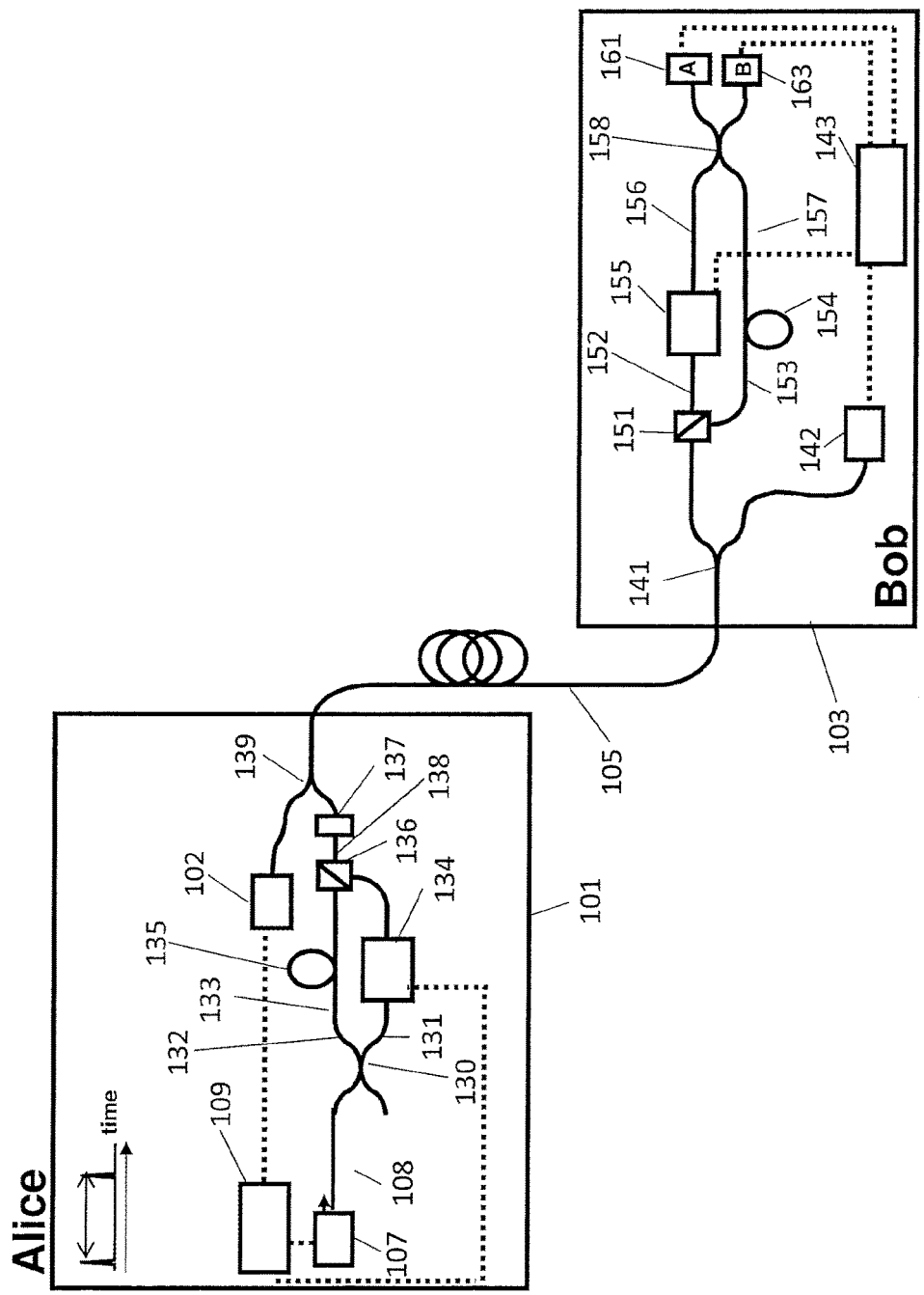
FIG. 1 is a schematic of a quantum communication system.

In an embodiment, a component for a quantum communication system is provided, the component comprising:
an input section and a decoder section,
the input section comprising n waveguides, where n is an integer of at least 2,
the decoder section comprising m decoders, where m is an integer of at least 2, each decoder comprising at least one waveguide,
the input section and the decoder section being provided on a single substrate such that the waveguides are continuous and integrated between the input section and the decoder section,
the waveguides of the input section and the decoder section being arranged such that light pulses enter the waveguides of the decoder section via the waveguides of the input section and the m decoders operate in parallel.

The input section and the decoder section can be distinct sections. However, the terms input section and decoder section are given above to show that the n waveguides have the function of preparing and directing pulses into the interferometers or other decoders.

In a further embodiment, the component may further comprise an output section, the output section comprising p waveguides, where p is an integer of at least 2, the output section and the decoder section being provided on a single substrate such that the waveguides are continuous and integrated between the output section and the decoder section.

The output section may comprise detectors or just waveguides that guide the output of the decoder section to detectors.

In an embodiment, the component further comprising a router section, the router section comprising q waveguides, where q is an integer of at least 2, the router section and the input section being provided on a single substrate such that the waveguides are continuous and integrated between the outer section and the input section. In some embodiments, the router section and the input section may be the same. In further embodiments, the router section comprises a wave division demultiplexer that serves to separate an incoming multiplexed waveform into its different frequency components.

Embodiments may be integrated on a wide range of platforms based on semiconductors such as but not limited to InP, Si, SOI, SiN, SiO2, SiON, GaAs, and also on glasses and polymers.

In an embodiment, the substrate is a passive material. However, the substrate could also be an active material. A passive platform will generally have lower propagation losses than an active platform. Typically: propagation losses on an active platform can be of the order of 3 dB/cm (50% loss per cm of propagation in the circuit) while propagation losses on a passive platform can be less than 0.1 dB/cm (2.3% loss per cm of propagation in the circuit). The losses in a receiver apparatus decrease the distance at which quantum communication is secure.

In an embodiment, the substrate is selected from Si, SOI (silicon on insulator), SiN (silicon nitride), SiO2 (silicon dioxide), SiON (Silicon Oxynitride), glasses, polymers, diamond or silicon carbide.

At least one decoder of the decoding section may comprise an asymmetric Mach-Zehnder Interferometer (AMZI), said AMZI comprising at least two of said waveguides. The AMZI may comprise a phase modulator. In an example, the AMZI comprises an electrode provided over a part of one of the two of said waveguides comprised in the AMZI.

In an embodiment, the decoder section comprises a first decoder and a second decoder out of the plurality of m decoders, the first decoder being adapted to decode using a first measurement basis and the second decoder being adapted to decode using a second measurement basis, different from the first measurement basis, the waveguides of the input section being configured to randomly direct photons to the first decoder or the second decoder using a passive switching arrangement. The passive switching arrangement may comprise a coupler with a least two outputs, the coupler being a passive coupler whereby a photon entering the coupler randomly exits the coupler through one of the at least two outputs.

In the component the m decoders may be adapted to perform parallel decoding of two streams of input pulses. For example, the parallel decoding may use at least two protocols. The protocols may be selected from BB84, B92, COW, DPS, RFI and 6 state BB84.

Each decoder comprises a plurality of elements, said elements comprising said waveguides and wherein different protocols may be realised by combining different elements from different decoders.

In an embodiment, the input interface is adapted to direct light pulses into two or more decoders. The input interface and/or router may comprises a wavelength division multiplexer adapted to send the input light pulses to different decoders depending on the wavelengths of the light pulses.

The output section may also comprise de-multiplexers. The output section may, if provided on an active platform comprise detectors.

In a further embodiment, a method of fabricating a component is provided, said method comprising:
providing a substrate;
forming a cladding layer on said substrate;
forming a waveguide layer on said cladding layer;
patterning said waveguide layer; and
forming a cladding layer overlying said waveguide layer,
wherein patterning said waveguide layer comprises:
  patterning an input section and a decoder section to form a plurality of waveguides,
    the input section comprising comprises n waveguides, where n is an integer of at least 2,
    the decoder section comprising m decoders, where m is an integer of at least 2, each decoder comprising at least one waveguide,
    the input section and the decoder section being provided on the said substrate such that the waveguides are continuous and integrated between the input section and the decoder section,
    the waveguides of the input section and the decoder section being arranged such that light pulses enter the waveguides of the decoder section via the waveguides of the input section and the m decoders operate in parallel.

Different techniques can be used to pattern the waveguides, including (optical and/or electron) lithography (plasma and/or chemical) etching, direct laser writing, ion exchange, nanoimprint etc.

FIG. 1 shows a basic Quantum Key Distribution system. The sender "Alice" 101 sends encoded photons to receiver "Bob" over optical fibre 105.

Alice's equipment 101 comprises a signal laser diode 107, an imbalanced fibre asymmetric Mach-Zehnder interferometer (AZMI) 133 connected to the output of the signal laser diode, an attenuator 137 connected to the output of the AMZI 133, a bright clock laser 102, a wavelength division multiplexing (WDM) coupler 139 coupling the output from attenuator 137 and clock laser 102 and bias electronics 109 connected to said signal laser diode 107 and clock laser 102.

The AZMI 133 comprises an entrance coupler 130, one exit arm of entrance coupler 130 is joined to long arm 132, long arm 132 comprises a loop of fibre 135 designed to cause an optical delay, the other exit arm of entrance coupler 130 is joined to a short arm 131, short arm 131 comprises phase modulator 134 an exit polarising beam combiner 136 is connected to the other ends of long arm 132 and short arm 131. All components used in Alice's AMZI 133 are polarisation maintaining.

During each clock signal, the signal diode laser 107 outputs one optical pulse. The signal diode laser 107 is connected to biasing electronics 109 which instruct the signal diode laser 107 to output the optical pulse. The biasing electronics are also connected to clock laser 102.

The signal pulses are then fed into the AZMI interferometer 133 through a polarisation maintaining fibre coupler 130. Signal pulses are coupled into the same axis (usually the slow axis) of the polarisation maintaining fibre, of both output arms of the polarisation maintaining fibre coupler 130. One output arm of the fibre coupler 130 is connected to the long arm 132 of the AZMI while the other output arm of the coupler 130 is connected to the short arm 131 of the AZMI 133.

The long arm 132 of the AZMI 133 contains an optical fibre delay loop 135, while the short arm 131 contains a fibre optic phase modulator 134. The fibre optic phase modulator 134 is connected to biasing electronics 109 which will be described in more detail later. The length difference of the two arms 131 and 132 corresponds to an optical propagation delay of $t_{delay}$. Typically the length of the delay loop 135 may be chosen to produce a delay $t_{delay}$ ~5 ns. Thus, a photon travelling through the long arm 132 will lag that travelling through the short arm 131 by a time of $t_{delay}$ at the exit 136 of the interferometer 133.

The two arms 131, 132 are combined together with a polarisation beam combiner 136 into a single mode fibre 138. The fibre inputs of the polarisation beam combiner 136 are aligned in such a way that only photons propagating along particular axes of the polarisation maintaining fibre, are output from the combiner 136. Typically, photons which propagate along the slow axis or the fast axis are output by combiner 136 into fibre 138.

The polarising beam combiner 136 has two input ports, an in-line input port and a 90° input port. One of the input ports is connected to the long arm 132 of the interferometer 133 and the other input port is connected to the short arm 131 of the interferometer 133.

In this example, only photons polarised along the slow axis of the in-line input fibre of the in-line input port are transmitted by the polarising beam combiner 136 and pass into the fibre 138. Photons polarised along the fast axis of the in-line input fibre of the input port are reflected and lost.

Meanwhile, at the 90° input port of the beam coupler 136, only photons polarised along the slow axis of the 90° input fibre are reflected by the beam combiner 136 and pass into the output port, while those polarised along the fast axis will be transmitted out of the beam combiner 136 and lost.

This means that the slow axis of one of the two input fibres is rotated by 90° relative to the output port. Alternatively the polarisation may be rotated using a polarisation rotator (not shown) before one of the input ports of the polarising beam combiner (136).

Thus, photon pulses which passed through the long 132 and short arms 131 will have orthogonal polarisations.

The signal pulses are then strongly attenuated by the attenuator 137 so that the average number of photons per signal pulse $\mu \ll 1$.

The signal pulses which are outputted by the combiner 136 into single mode fibre 138 are then multiplexed with a bright laser clock source 102 at a different wavelength using a WDM coupler 139. The multiplexed signal is then transmitted to the receiver Bob 103 along an optical fibre link 105. The biasing electronics 109 synchronises the output of the clock source 102 with the signal pulse.

Bob's equipment 103 comprises WDM coupler 141, a clock recovery unit 142 connected to an output of coupler 141, an AZMI 156 connected to the output of output coupler 141, two single photon detectors A 161, B 163 connected to the output arms of AZMI 156 and biasing electronics 143 connected to the detectors 161, 163. Bob's interferometer 156 contains an entrance polarising beam splitter 151 connected to both: a long arm 153 containing a delay loop 154; and a short arm 152 containing a phase modulator 155. The long arm 153 and short arm 152 are connected to an exit polarisation maintaining 50/50 fibre coupler 158. All components in Bob's AZMI 156 are polarisation maintaining.

Bob first de-multiplexes the transmitted signal received from Alice 101 via fibre 105 using the WDM coupler 141. The bright clock laser 102 signal is routed to an optical receiver 142 to recover the clock signal for Bob 103 to synchronise with Alice 101.

The signal pulses which are separated from the clock pulses by WDM coupler 141 are fed into a polarisation controller 144 to restore the original polarisation of the signal pulses. This is done so that signal pulses which travelled the short arm 131 in Alice's interferometer 133, will pass the long arm 153 in Bob's AZMI 156. Similarly, signal pulses which travelled through the long arm 132 of Alice's AZMI 133 will travel through the short arm 152 of Bob interferometer.

The signal then passes through Bob's AZMI 156. An entrance polarising beam splitter 151 divides the incident pulses with orthogonal linear polarisations. The two outputs of the entrance polarisation beam splitter 151 are aligned such that the two output polarisations are both coupled into a particular axis, usually the slow axis, of the polarisation maintaining fibre. This ensures that signal pulses taking either arm will have the same polarisation at the exit 50/50 polarisation maintaining coupler 158. The long arm 153 of Bob's interferometer 156 contains an optical fibre delay loop 154, and the short arm 152 contains a phase modulator 155. The two arms 152, 153 are connected to a 50/50 polarisation maintaining fibre coupler 158 with a single photon detector A 161, B 163 attached to each output arm.

Due to the use of polarising components, there are, in ideal cases, only two routes for a signal pulse travelling from the entrance of Alice's AZMI to the exit of Bob's AZMI:
  i. Alice's Long Arm 132-Bob's Short Arm 152 (L-S) and
  ii. Alice's Short Arm 131-Bob's Long Arm 153 (S-L).

By controlling the voltages applied to their phase modulators 134, 155, Alice and Bob determine in tandem whether paths (i) and (ii) undergo constructive or destructive interference at detectors A 161 and B 163. The phase modulators 134, 155 are connected to respective biasing means 109 and 143 to ensure synchronisation.

The variable delay line 157 can be set such that there is constructive interference at detector A 161 (and thus destructive interference at detector B 163) for zero phase difference between Alice and Bob's phase modulators. Thus for zero phase difference between Alice's and Bob's modulators and for a perfect interferometer with 100% visibility, there will be a negligible count rate at detector B 163 and a finite count rate at A 161.

If, on the other hand, the phase difference between Alice and Bob's modulators 134, 155 is 180°, there should be destructive interference at detector A 161 (and thus negligible count rate) and constructive at detector B 163. For any other phase difference between their two modulators, there will be a finite probability that a photon may output at detector A 161 or detector B 163.

In the four-state protocol, which is sometimes referred to as BB84, Alice sets the voltage on her phase modulator to one of four different values, corresponding to phase shifts of 0°, 90°, 180°, and 270°. Phase 0° and 180° are associated with bits 0 and 1 in a first encoding basis, while 90° and 270° are associated with 0 and 1 in a second encoding basis. The second encoding basis is chosen to be non-orthogonal to the first. The phase shift is chosen at random for each signal pulse and Alice records the phase shift applied for each clock cycle.

Meanwhile Bob randomly varies the voltage applied to his phase modulator between two values corresponding to 0° and 90°. This amounts to selecting between the first and second measurement bases, respectively. Bob records the phase shift applied and the measurement result (i.e photon at detector A 161, photon at detector B 163, photon at detector A 161 and detector B 163, or no photon detected) for each clock cycle.

In the BB84 protocol, Alice and Bob can form a shared key by communicating on a classical channel after Bob's measurements have taken place. Bob tells Alice in which clock cycles he measured a photon and which measurement basis he used, but not the result of the measurement. Alice then tells Bob the clock cycles in which she used the same encoding basis and they agree to keep only those results, as in this case Bob will have made deterministic measurements upon the encoded photons. This is followed by error correction, to remove any errors in their shared key, and privacy amplification to exclude any information known to an eavesdropper.

The system in FIG. 1a is also suitable for implementing the two-state protocol known as B92. In this case only one detector is needed on one output arm of Bob's interferometer 156. The arm lengths are calibrated so that for zero phase delay the photon rate into the detector is maximum (constructive interference).

For the B92 protocol Alice applies phase shifts of 0 and 90° on her phase modulator randomly. Alice associates 0 phase delay with bit=0, and 900 phase delay with bit=1. Bob applies 1800 or 2700 to his phase modulator randomly, and associates 180° with bit=1 and 270° with bit=0. After Bob's detections, he tells Alice in which clock cycle he detected a photon and they keep these bits to form a shared sifted key. They then perform error correction and privacy amplification upon the sifted key.

The above is an example of phase encoding where the system can be adapted for either the BB84 or B92 protocol. However, other protocols are possible using the same hardware, as for example the SARG04 protocol. In the above system just one protocol is implemented at one time. Also, only one sequence of pulses can be encoded and then decoded.

SARG04 Protocol

The protocol works as follows: First, Alice chooses one of the four pairs and one of the two states in the pair and transmits it to Bob. Then, Bob performs a measurement with two bases $\{|0\rangle, |1\rangle\}$ or $\{|+\rangle, |-\rangle\}$. After that, sifting is performed for unambiguous discrimination between states in an announced pair. For example, assume Alice transmits $|0\rangle$ state in a set $\{|0\rangle, |+\rangle\}$ and Bob measures it with a basis $\{|+\rangle, |-\rangle\}$. If Bob measures $|+\rangle$ state, then it is discarded since $|+\rangle$ can be the result of measuring either $|0\rangle$ or $|+\rangle$. If Bob measures $|-\rangle$ state, then it is stored for post processing because $|-\rangle$ can only be obtained by measuring $|0\rangle$. Since two states in a set are non-orthogonal, the PNS attack cannot provide Eve with perfect information on the encoded bit.

Differential Phase Shift Protocol:

Differential phase shift (DPS) QKD is the first example of the distributed-phase-reference QKD protocols. The most common DPS protocol exploits trains of coherent light pulses separated by a fixed delay. Information is encoded in the relative phase between two adjacent pulses. To realise this encoding, Alice generates trains of pulses and applies random phase modulations to each of the pulses. To decode the information, Bob sends the incoming pulses from Alice into an asymmetric Mach-Zehnder interferometer with a path difference between the long and short arms matching the delay between two consecutive pulses from Alice. When Bob obtains a detection event of the incoming pulses, he announces the measurement setting he employed, i.e., he announces in which pair of the pulses he succeeded in reading out the relative phase, and Alice keeps the corresponding information as the sifted bit. Alice and Bob proceed to error correction of the sifted bits, and then they perform privacy amplification to generate a secret key.

Coherent One Way Protocol:

In the Coherent One Way (COW) protocol, each bit is encoded by sending a weak coherent pulse in one out of two possible time-bins, while the other time-bin contains ideally the vacuum. These states can be discriminated by a simple time-of-arrival measurement on each state. In addition, a third state called decoy sequence, with both time-bins containing weak coherent pulses is randomly prepared. As in distributed-phase reference QKD, the channel is monitored by measuring the coherence between pulses in two successive, non-empty time-bins, either within a bit when a decoy sequence was prepared, or across bit separation whenever corresponding sequences are prepared. The coherence measurement is performed in an asymmetric Mach-Zehnder interferometer with a path difference between the long and short arms matching the delay between two consecutive pulses from Alice. The cases where two successive non-empty time-bin occur within a bit or across two successive bits are discriminated by sending part of the coherent pulses in a time decoding line, where pulses will travel before reaching a photodetector that records the arrival time. The visibility of the interferometer provides the test parameter for eavesdropping. This additional measurement across bit separation largely reduces the advantages an eavesdropper could have due to photon number splitting (PNS) attacks. As a consequence, the optimal average number of photons which can be sent per qubit becomes independent of the fibre transmission, but dependent on the Quantum Bit Error Rate (QBER) of the time-bin detection, and of the visibility of the interferometer. The COW protocol present the advantages that is can be used with a completely passive receiver without any active element for base choice and that it requires only two detectors.

6-State BB84 Protocol

The BB84 protocol can be realized with 6 states (6-BB84) instead of 4. In the standard 4-state BB84, only 2 bases of the Poincare sphere are utilized. The information is encoded in the phase difference between two consecutive pulses. Phase 0° and 180° are associated with bits 0 and 1 in a first encoding basis, while 90° and 270° are associated with 0 and 1 in a second encoding basis. The third basis can be viewed as a coherent superposition of the first and second bases and the states associated to bits 0 and 1 correspond to states where the two consecutive pulses comprise one coherent pulse and one vacuum pulse, the vacuum pulse being either the first (bit 0) or the second (bit 1) of the two consecutive pulses. We refer to this basis as the time-bin basis. To decode the 6-BB84 information, BOB needs 2 AMZI decoders to measure the states of the BB84 bases and a time decoding line to measure the states of the third basis.

Reference Frame Independent Protocol:

The Reference Frame Independent (RFI) protocol uses the same bases as the 6-BB84 protocol. The difference between both protocols resides in the post-processing of the quantum information. In the 6-BB84, all bases are used to transmit information BOB and ALICE want to minimize the QBER in each basis in order to prevent Eavesdropping. However, fluctuations in the transmission medium—reference frame fluctuations→can introduce additional noise in the relative phase between consecutive pulses. The RFI protocol therefore uses the time-bin basis to transmit information and calculate the reference frame independent QBER by combining the results from the first two bases.

The table below summarizes the hardware needed to realize each protocol described above. The 2 AMZIs of the BB84 protocol can be replaced by 1×AMZI in combination with an active phase modulator in one arm to select the measurement basis

| Protocol | AMZI 1 | AMZI 2 | Time decoder |
|---|---|---|---|
| BB84/B92/SARG04 | X | X | |
| COW | X | | X |
| DPS | X | | |
| 6-BB84/RFI | X | X | X |

Figure 2:
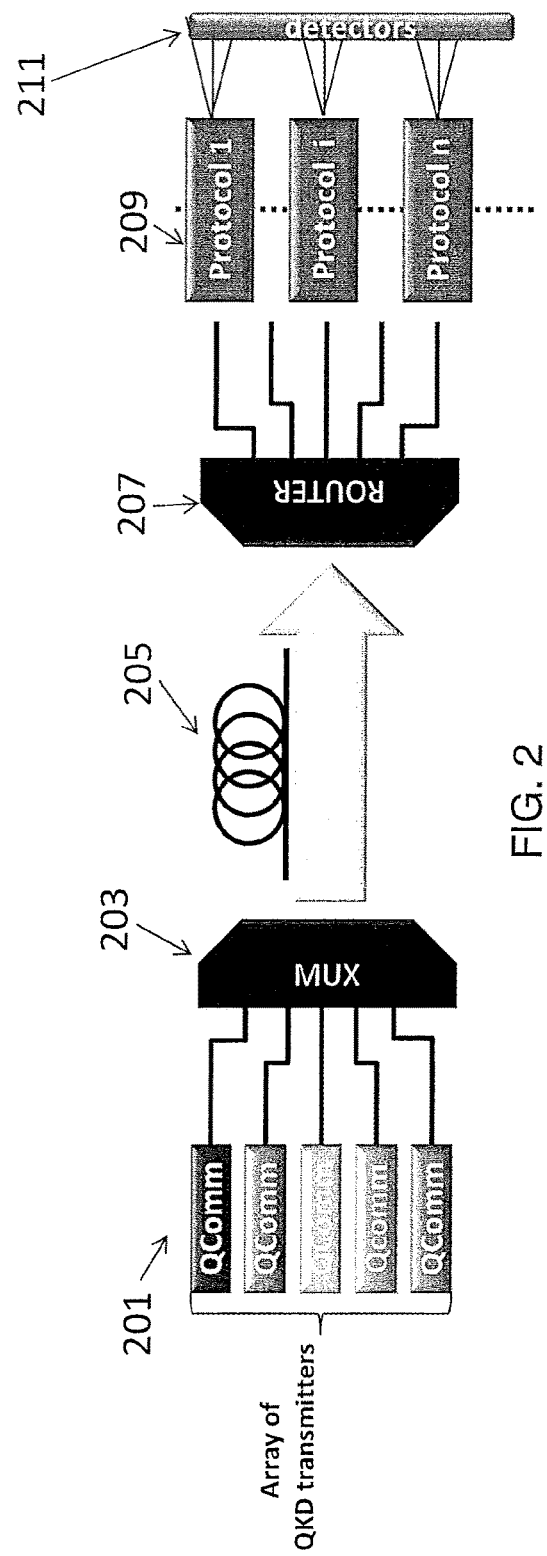
FIG. 2 is a schematic of a quantum communication with an array of QKD transmitters.

FIG. 2 in accordance with an embodiment, shows a system configured for parallel encoding and decoding.

An array 201 of transmitters is provided. The transmitters can be all at the same location (e.g. in a server room or on a same chip) or at different locations (e.g. at different points of a communication network). Each transmitter in the array is adapted to output weak light pulses. In an embodiment, these weak light pulses are encoded in a similar manner to that described above to produce cryptographic keys. The output of the transmitters is then multiplexed using multiplexer 203 and transmitted over fibre optic cable 205. The cryptographic keys can be encoded using the same protocol or different protocols. The multiplexer 203 can use any type of multiplexing for example, time division multiplexing, wavelength division multiplexing etc.

The multiplexed signal is then received by router 207 which then directs the incoming cryptographic keys into parallel decoders 209. Parallel decoders 209 decode the incoming keys and the decoded information is sent to detectors 211.

Implementing the decoders 209 using the technology described in relation to FIG. 1 results in a decoder that is bulky and makes the implementation of a multi-protocol receiver impractical for large scale deployment.

Figure 3:
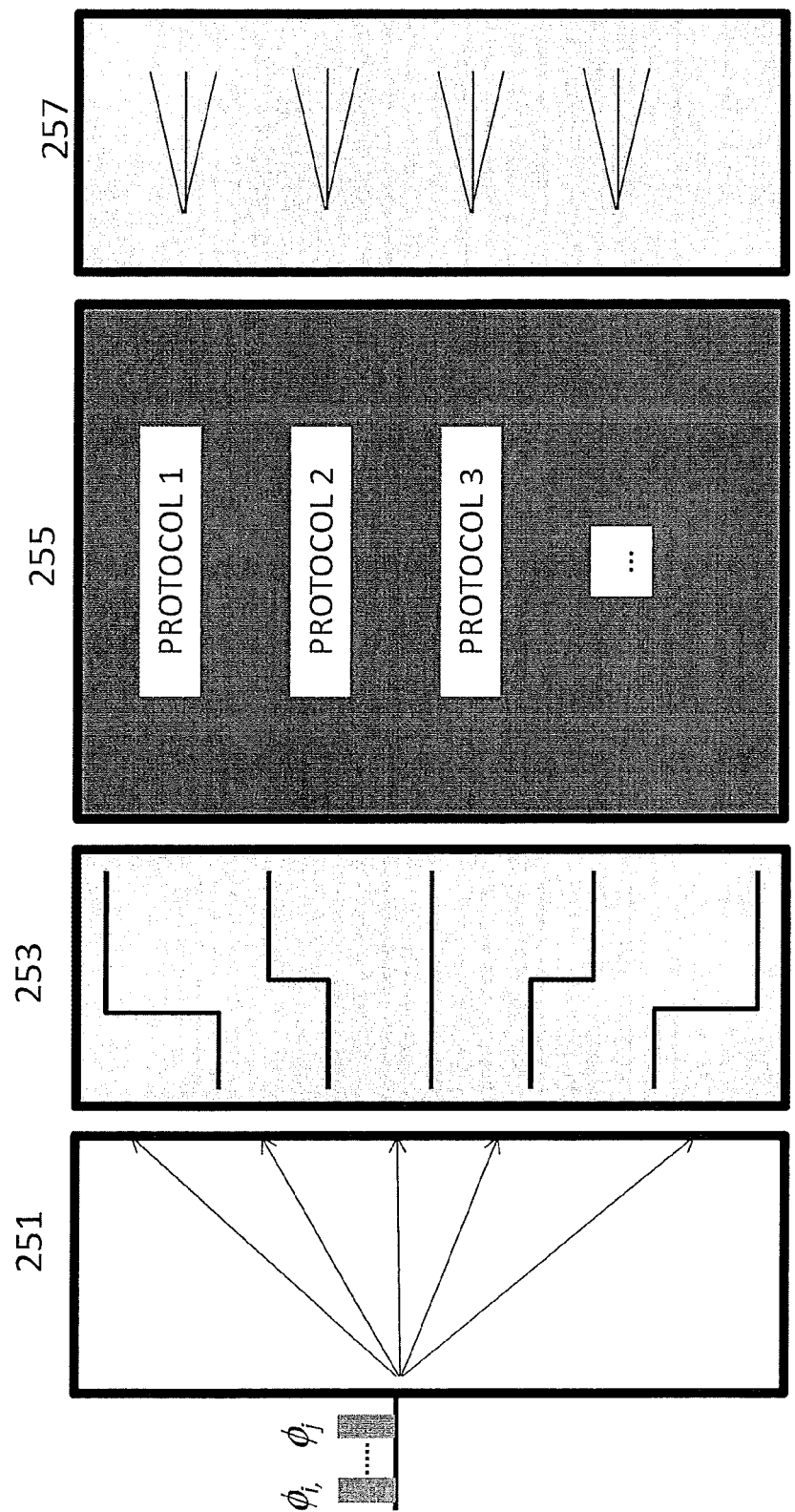
FIG. 3 is a schematic of a receiver for a quantum communication system in accordance with an embodiment.

FIG. 3 relates to an integrated single chip solution for an on-chip integrated multi-protocol, multi-wavelength detection apparatus where a single circuit is able to decode quantum information in parallel and where the parallel decoding can implement the same protocol or different protocols.

The integrated optical device of FIG. 3 comprises a router 251, an input interface 253, a parallel decoder 255 and an output interface 257. The integrated optical device is configured to receive and measure phase encoded pulses of light in order to generate quantum cryptographic keys in parallel according to one or more quantum key distribution protocols and at one or more wavelengths.

The components are described below in more detail:
Parallel decoder 255: an assembly of integrated optical waveguides and further integrated optical components configures to decode light pulses encoded in phase according to different QKD protocols and able to operate in parallel
Input interface 253: an assembly of integrated optical waveguides and further integrated optical components configured to prepare an incoming sequence of light pulses for decoding in the decoder such that:
the interface comprises a fixed number of input waveguides
in the case of more than one input waveguide, a sequence of pulses entering a given input waveguide will be prepared to be decoded according to a specific protocol
in the case of a single input waveguide the interface can be dynamically reconfigured to prepare the decoding according to a given protocol
Router 251: in the case of an interface with a plurality of input waveguides, the router is an integrated optical or opto-electro-mechanical device configured to route an incoming sequence of encoded pulses from a further QKD transmitter device to a specific input waveguide of the input interface
Output interface 257: an assembly of integrated optical waveguides and further integrated optical components configured to send the decoded sequence of pulses to further optical detection components.

Figure 4:
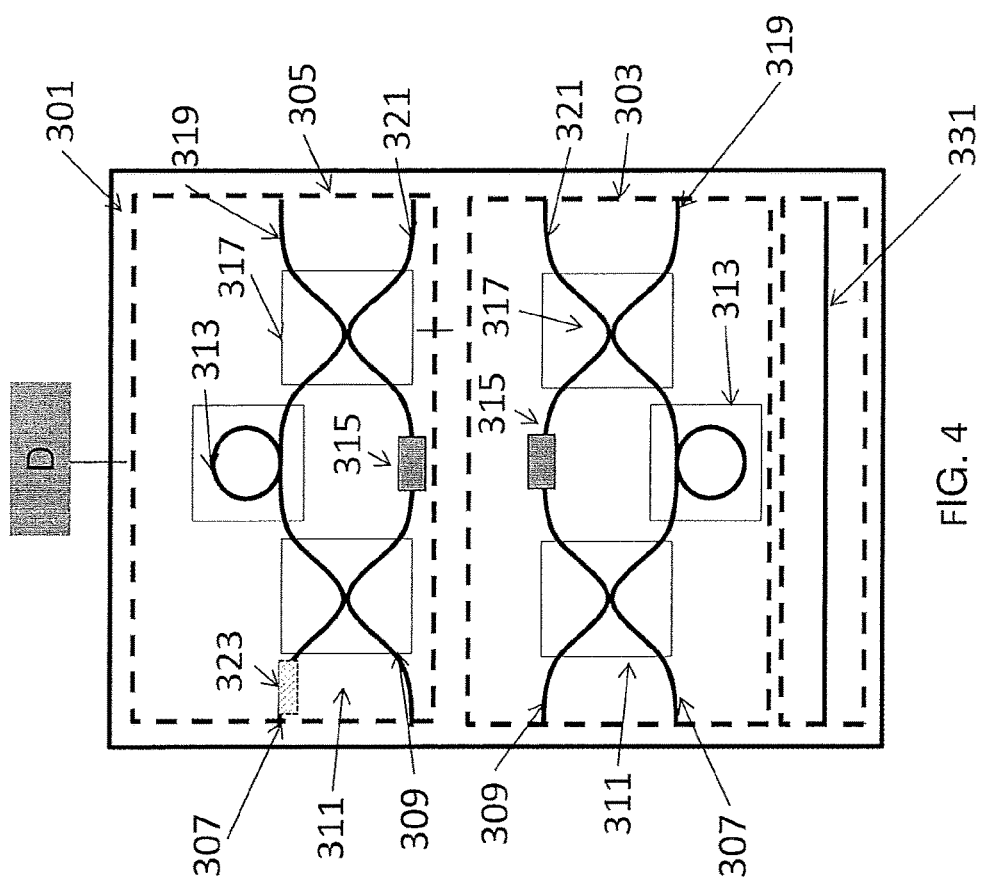
FIG. 4 is a schematic of a decoder section of a component in accordance with an embodiment.

FIG. 4 is a schematic of a parallel encoder in accordance with an embodiment. This embodiment can be used to support parallel decoding of a number of different protocols. However, different arrangements of AMZIs can be used as required for supporting decoding of different protocols.

In this embodiment, the parallel decoder 301 is composed of at least two asymmetric Mach-Zehnder interferometers (AMZI) 303 and 305 for phase decoding.

The first AMZI 303 comprises two input waveguides 307, 309. The two input waveguides 307, 309 lead to an input coupler 311. The input coupler in this example is a 50:50 input coupler where a photon entering the coupler 311 from either input 307, 309 has an equal chance of exiting through either of the two outputs. The input coupler 311 has a first output that leads to a first delay line 313 on one arm of the AMZI. The other of the outputs of the coupler 311 leads to the other arm of the AMZI with a phase modulator 315 to decode the phase state of the pulses in each of the arms as described in relation to FIG. 1 for the BB84 and B92 protocols. In the example of FIG. 4, the phase modulator 315 is shown in the short arm of the AMZI. However, the phase modulator 315 could also be placed in the long arm. In order to account for extra propagation losses in the long arm, the input coupler could differ from 50:50 in a way to balance the powers at the output of the long and short arms.

The long arm and the short arm of the AMZI are then coupled by the output coupler 317. In this example, the output coupler 317 is a 50:50 coupler. The outputs of the output coupler are output waveguides 319 and 321.

The decoder comprises a second AMZI 305 that is configured in the same manner as the first AMZI 303. To avoid any unnecessary repetition, like reference numerals will be used to denote like features.

In the above design, the phase modulators do not need to be switched during operation of the system as the basis is switched by the photons randomly entering one of the two AMZIs. Thus, the above decoder can be realized on both passive and active platforms because it does not require high speed reconfiguration and hence can be fabricated on an ultra-low loss platform.

If the phase modulators needed to be switched in order to randomly vary the basis, the phase modulators would need to select the basis at high frequency (>1 GHz), which means that the circuit need to be reconfigurable at least at that speed. To date, this is impossible on any existing passive platform. However, operating QKD at high speed is possible in the design described with reference to FIG. 4 since both AMZIs can be configured to measure orthogonal bases. Since, the propagation losses on active platforms are at least one order of magnitude higher than on passive platforms, the ability to use a passive platform is an advantage. The more losses in the transmitter, the shorter the distance at which QKD can be securely realized.

1. The parallel decoder may comprise a further waveguide 331 for time-bin decoding (or pulse arrival time recording). In a further embodiment, the parallel decoder may comprise one or more further phase modulator 323 on one or more of the four input optical waveguide to stabilize the phase difference between both AMZIs 303, 305.
2. Description of the parallel decoder—multi-protocol operation To decode a sequence of pulses encoded in phase according to the DPS protocol:
   1. Incoming light pulses are sent to one of the AMZIs 303, 305 input waveguides 307, 311.
   2. The phase modulator 315 of the corresponding AMZI is configured to impart a phase difference of PI radians between pulses traveling in the short and long arms of the AMZI.
3. To decode a sequence of pulses encoded in phase according to the BB84 protocol:
   1. The incoming pulses randomly sent to either one of the inputs of the first AMZI 303 or the second AMZI 305.
   2. The phase modulators 315 of each AMZI 303, 305 are configured to impart a phase difference of PI radians between the pulses traveling in the short and long arms of each AMZI
   3. The phase modulator 323 can be used to stabilize a phase difference of PI/2 radian between pulses traveling in the long (short) arm of one AMZI and pulses traveling in the long (short) arm of the other AMZI, thus, the measurement basis is determined by which of the AMZIs 303, 305 decode the pulses.

Figure 5:
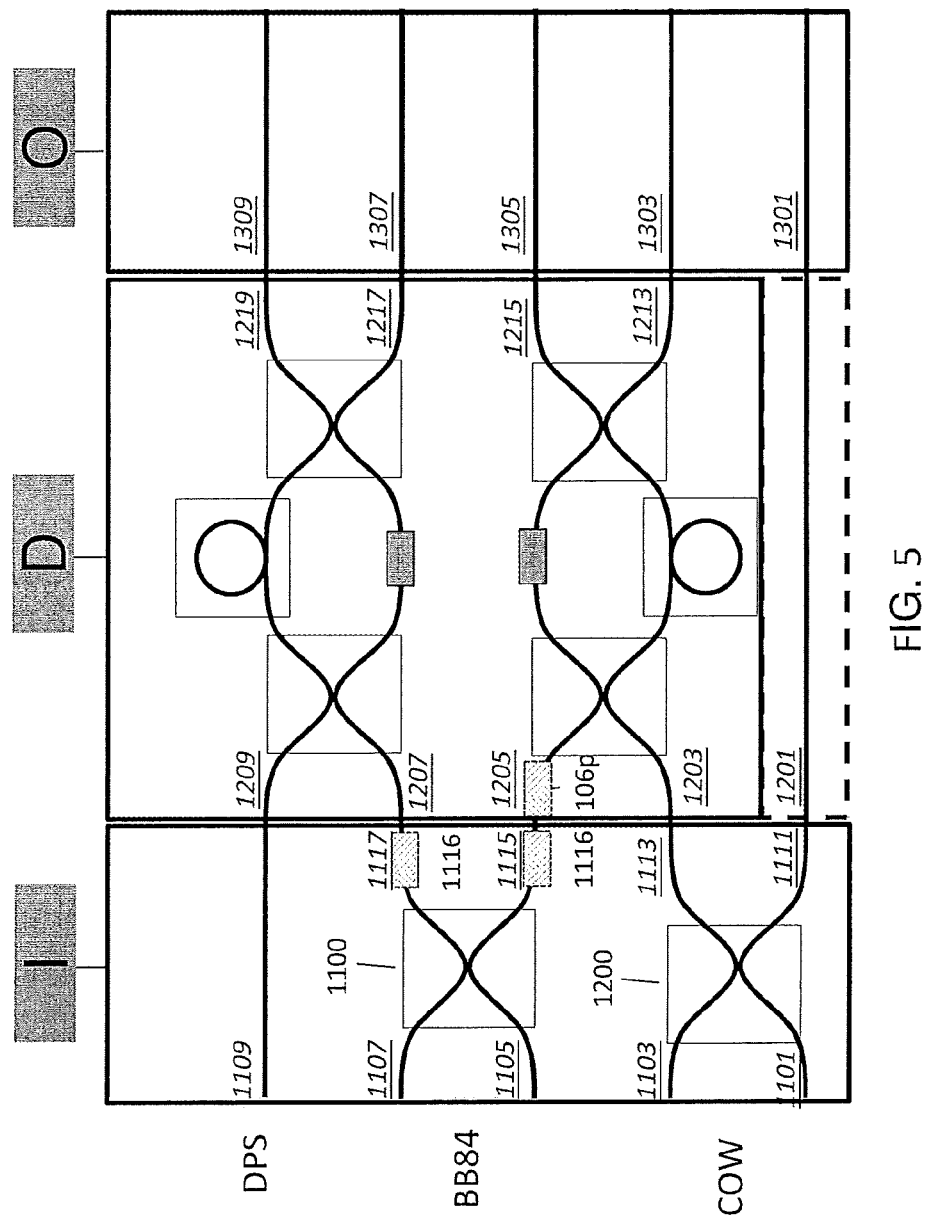
FIG. 5 is a schematic of a component in accordance with an embodiment adapted to perform the DPS, BB84 and COW protocols.

4. To decode a sequence of pulses encoded in phase according to the COW protocol:
   1. The incoming pulses are split between one input of one AMZI 303, 305 and to one time-bin decoder 311
   2. the phase modulator 315 of the corresponding AMZI 303, 305 is configured to impart a phase difference of PI radians between pulses traveling along the short and long arms of the AMZI
   3. Alternatively: the incoming pulses are split between one input of a first AMZI 303 and both inputs of a second AMZI 305
      1. the phase modulator of the first AMZI 303 is configured to impart a phase difference of PI radians between pulses traveling along the short and long arms of the AMZI The relative phase of the pulses traveling in each input waveguide of the second AMZI is adjusted such that the pulses travel along the short arm only OR: The relative phase of the pulses traveling in the short and long arm of the second AMZI is set to PI/2 such that the joint signal at the output of both arms of the second AMZI correspond to the decoded time-bin signal. FIG. 5 is a schematic of a multiple input interface. The input interface (I) is a section of the integrated optical device comprising an arrangement of integrated optical waveguides and further integrated optical components. In this embodiment, the input interface directs pulses to a parallel decoder of the type described with reference to FIG. 4. However, other configurations of parallel decoders could be used. To avoid unnecessary repetition, like reference numerals will be used to denote like features.

In an embodiment, the interface comprises:

Five input waveguide 1101, 1103, 1105, 1107 and 1109. The input interface prepares and directs the light pulses towards the parallel decoder.

One waveguide 1109 used to send incoming pulses to a single input 1209 of one AMZI in the parallel decoder section for decoding according to the DPS protocol.

One 2×2 coupler 1100 used to split incoming pulses in one of the input waveguides 1107, 1105 into two output waveguides 1117 and 1115, each connected to one input waveguide 1207, 1205 (respectively) of a distinct AMZI of the parallel decoder section for decoding according to the BB84 protocol One 2×2 coupler 1200 used to split incoming pulses in one of the input waveguides 1103, 1011 into two output waveguides 1111, 1113, one connected to one input waveguide 1203 of one AMZI of the parallel decoder section and one connected to a time-bin decoding waveguide 1201 of the parallel decoder section for decoding according to the COW protocol The input interface may comprise at least one further phase modulator 1116 on one or both output optical waveguide (1115 and 1117) to stabilize the phase difference between both AMZIs.

The optical couplers 1100 and 1200 may have optical splitting ratio of 50:50 or any arbitrary ratio able to create an imbalance in the intensities of the pulses in the arms 1115 and 1117 and 1111 and 1113 for optimal operation of the decoding protocols.

In FIG. 5 the interface operates as follows:
1. Input waveguide 1109 is connected to input waveguide 1209 such that an incoming sequence of pulses on 1109 will further be decoded according to the DPS protocol
2. Input waveguide 1107 is coupled to output waveguides 1117 and 1115 in a 2×2 coupler 1100

Input waveguides 1105 is coupled to output waveguides 1117 and 1115 by a 2×2 coupler 1100.

Output waveguide 1117 is connected to input waveguide 1207 and output waveguide 115 connected to input waveguide 1205 such that incoming sequences of pulses on 1105 or 1107 will be decoded according to the BB84 protocol 3. Input waveguide 1103 is coupled to output waveguides 1113 and 1111 in a 2×2 coupler 1200 and Input waveguides 1101 is coupled to output waveguides 1113 and 1111 in a 2×2 coupler 1200

Output waveguide 1113 is connected to input waveguide 1203 and output waveguide 1111 connected to input waveguide 1201 such that incoming sequences of pulses on 1101 or 1103 will be decoded according to the COW protocol 4. The 2 AMZIs is each have a pair of output waveguides, 1219, 1217 and 1215, 1213.

FIG. 5 also shows the multiple output interface. The output interface (O) is a section of the integrated optical waveguide comprising one waveguide for each AMZI output waveguide and time-bin decoding waveguide of the parallel decoder section.

In FIG. 5, waveguide 1201 is connected directly to waveguide 1301 in the output interface.

The pair of output waveguides 1213 and 1215 from one of the AMZIs are connected to waveguides 1303 and 1305 at the output interface respectively. Similarly, the pair of output waveguides 1217 and 1219 from the other of the AMZIs are connected to waveguides 1307 and 1309 at the output interface respectively.

Figure 6:
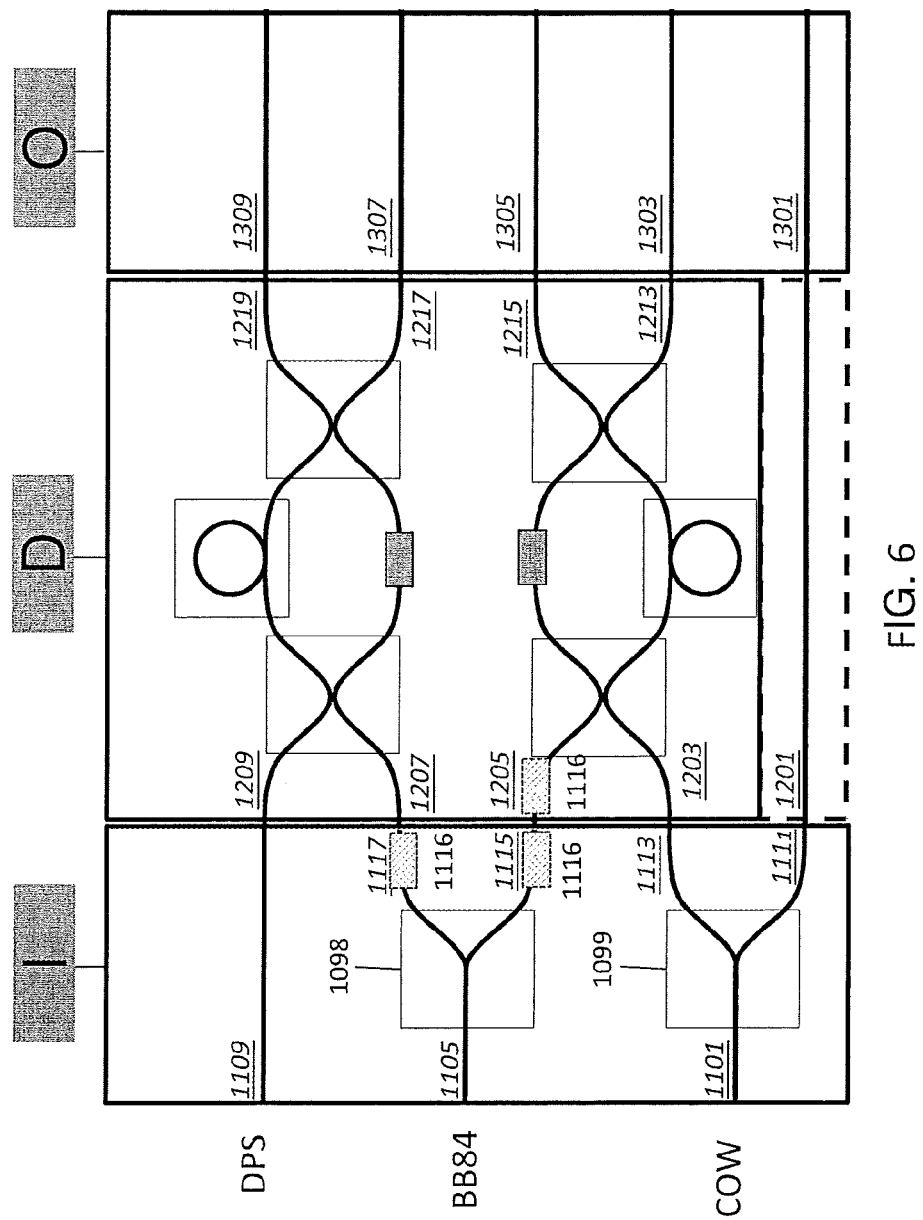
FIG. 6 shows a variation on the component of FIG. 5.

FIG. 6 shows a variation on the input interface of FIG. 5. The input interface of FIG. 6 interfaces to the same parallel decoder section of FIG. 5. In the above example of FIG. 5, there are five input waveguides. However, only one input is required to the BB84 protocol and the COW protocol. FIG. 6, uses 1 to 2 couplers as opposed to 2×2 couplers.

The interface comprises:
1. Three input waveguides 1101, 1105 and 1109
2. One waveguide 1109 used to send incoming pulses to a single input 1209 of an AMZI in the parallel decoder section for decoding according to the DPS protocol
3. One 1×2 optical coupler 1098 used to split incoming pulses in one of the input waveguide 1105 into two output waveguides, each connected to one input 1205, 1207 waveguide of a distinct AMZI of the parallel decoder section for decoding according to the BB84 protocol
4. One 1×2 optical coupler (1099) used to split incoming pulses in one of the input waveguide 1101 into two output waveguides, one connected to one input waveguide of one AMZIs of the parallel decoder section and one connected to a time-bin decoding waveguide 1201 of the parallel decoder section for decoding according to the COW protocol
5. The input interface can comprise at least one further phase modulator 1116 on one or both output optical waveguides 1115, 1117 to stabilize the phase difference between both AMZIs.
6. The optical couplers 1098 and 1099 may have optical splitting ratio of 50:50 or any arbitrary ratio able to create an imbalance in the intensities of the pulses in the arms 1115 and 1117 and 1111 and 1113 for optimal operation of the decoding protocols.

In FIG. 6 the interface operates as follows:
1. Input waveguide 1109 is connected to input waveguide 1209 such that an incoming sequence of pulses on 109 will further be decoded according to the DPS protocol
2. Input waveguide 1105 is coupled to output waveguides 1117 and 1115 in a 1×2 coupler
    Output waveguide 1117 is connected to input waveguide 1207 and output waveguide 1115 connected to input waveguide 1205 such that incoming sequences of pulses on 1105 will be decoded according to the BB84 protocol
3. Input waveguide 1101 is coupled to output waveguides 1113 and 1111 in a 2×2 coupler
    and Output waveguide 1113 is connected to input waveguide 1203 and output waveguide 1111 connected to input waveguide 1201 such that incoming sequences of pulses on 101 will be decoded according to the COW protocol The multiple output interface is also shown in FIG. 6. The decoder section and the multiple output interface of FIG. 6 are the same as those described in relation to FIG. 5.

Figure 7:
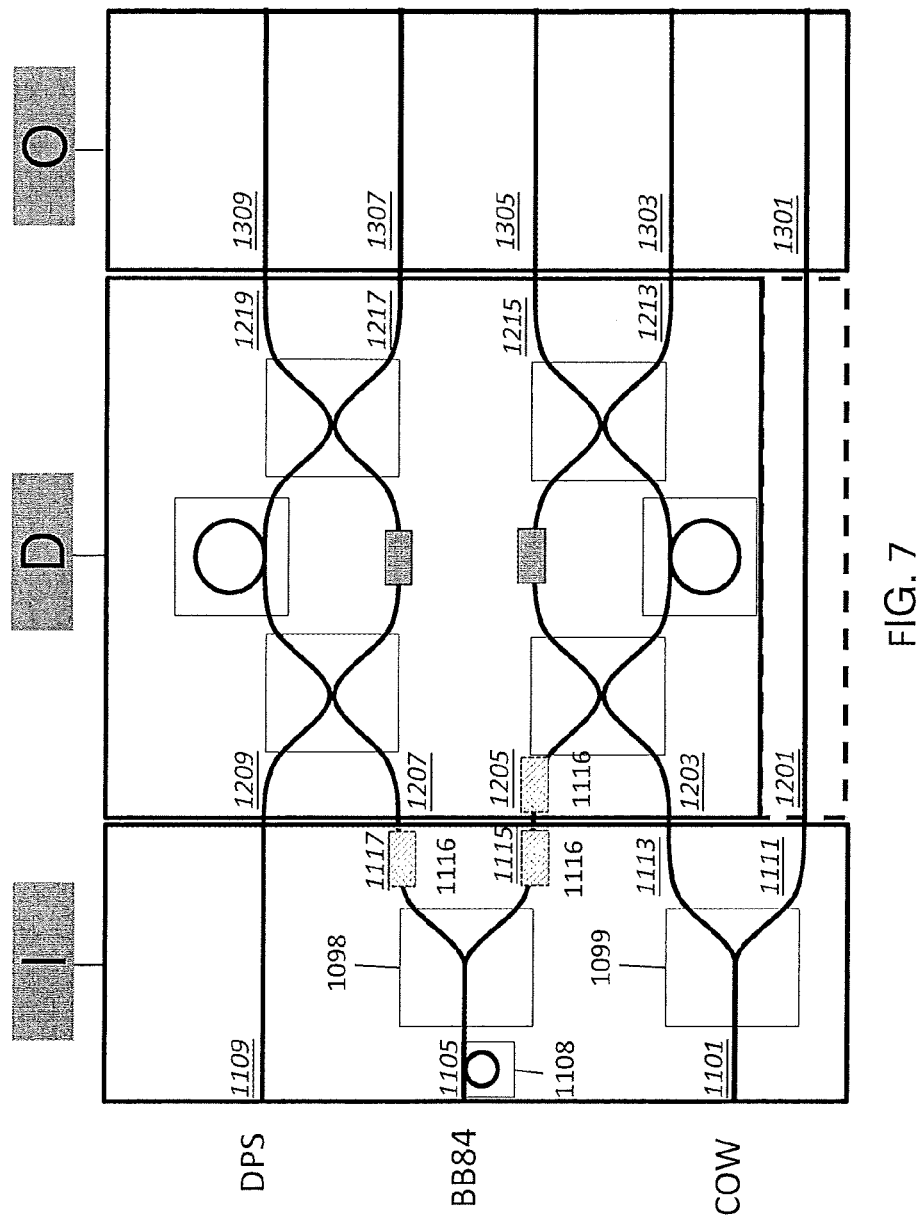
FIG. 7 shows a variation on the component of FIG. 5.

The embodiment of FIG. 6 can also be adapted for time division multiplexing as shown in FIG. 7. To avoid any unnecessary repetition, like reference numerals will be used to denote like features. In FIG. 7, the input interface comprises further short delay lines 1108 (e.g. half the delay of line 313 of FIG. 4) on one of multiple waveguides of the interface to time multiplex the protocol execution.

The short delay line 1108 on 1105 allows to time-offset the execution of the BB84 protocol with respect to the execution of the DPS and COW protocols.

Figure 8:
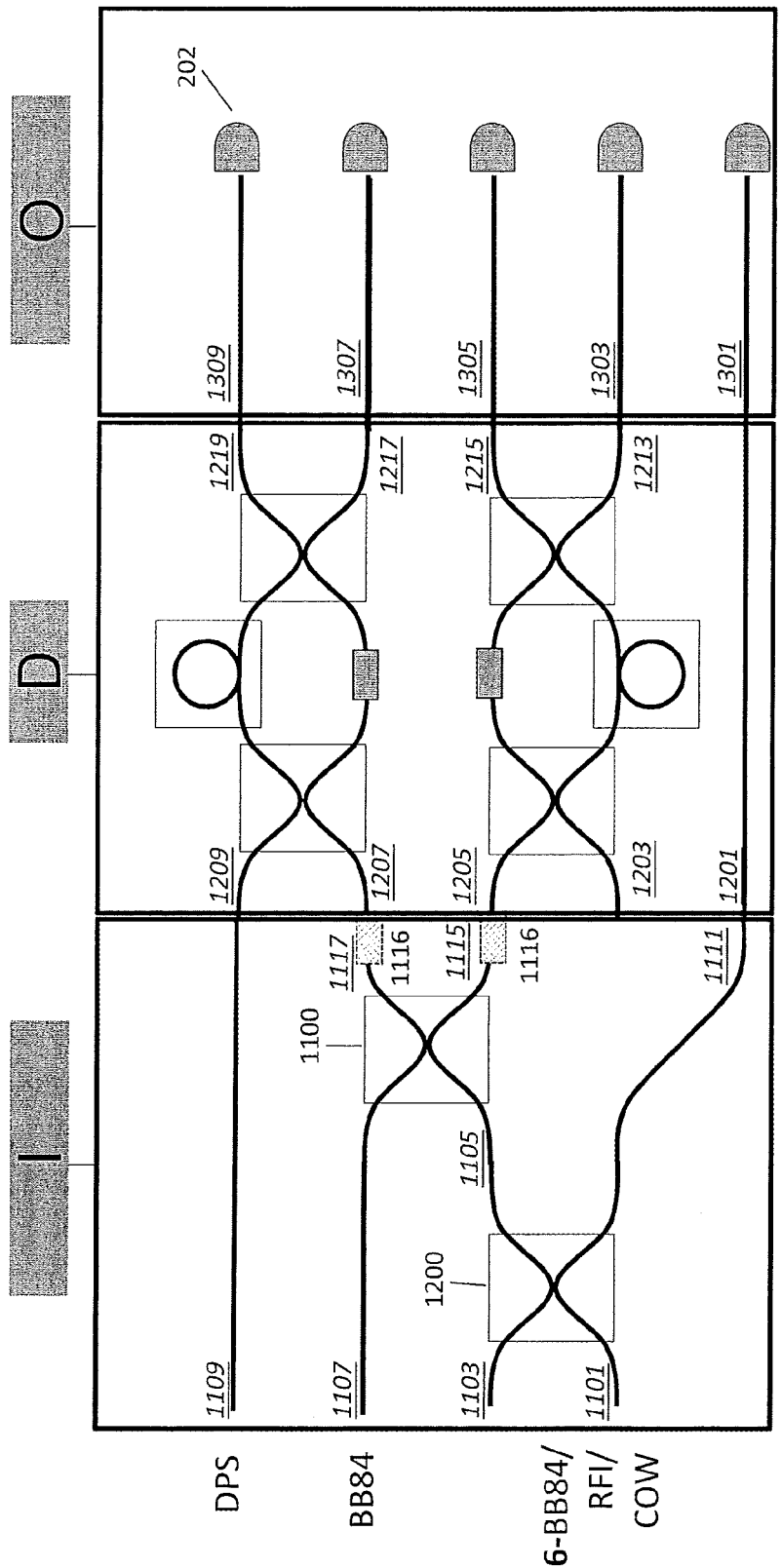
FIG. 8 is a schematic of a component in accordance with an embodiment adapted to perform the DPS, BB84, 6 state BB84 (6-BB84), RFI and COW protocols.

In FIG. 8 the interface comprises:
1. Four input waveguides ({1101, 1103, 1107 and 1109})
2. One straight waveguide 1109 is used to send incoming pulses to a single input of an AMZI in the parallel decoder section for decoding according to the DPS protocol
3. One 2×2 optical coupler 1100 used to split incoming pulses in one of the input waveguide 1107 into two output waveguides 1115, 1117, each connected to one input waveguide 1205, 1207 respectively of a distinct AMZIs of the parallel decoder section for decoding according to the BB84 protocol
4. One 2×2 optical coupler 1200 used to split incoming pulses in one of the input waveguides 1101 and 1103 into two output waveguides 1105, 1111, one waveguide 1105 connected to one input waveguide of the 2×2 coupler 1100 of the input interface section and one waveguide 1111 connected to a time-bin decoding waveguide 1201 of the parallel decoder section for decoding according to the RFI or COW protocols
5. The input interface can comprise at least one further phase modulator 1116 on one or both output optical waveguide (1115 and 1117) to stabilize the phase difference between both AMZIs.
6. The optical couplers 1100 and 1200 may have optical splitting ratio of 50:50 or any arbitrary ratio able to create an imbalance in the intensities of the pulses in the arms 1115 and 1117 and 1111 and 1113 for optimal operation of the decoding protocols.

In FIG. 8 the interface operates as follows:
1. Input waveguide 1109 is connected to input waveguide 1209 such that an incoming sequence of pulses on 1109 will further be decoded according to the DPS protocol
2. Input waveguide 1107 is coupled to output waveguides 1117 and 1115 in a 2×2 coupler 1100

Waveguides 1105 is coupled to output waveguides 1117 and 1115 in a 2×2 coupler 1100
    Output waveguide 1117 is connected to input waveguide 1207 and output waveguide 1115 is connected to input waveguide 1205 such that incoming sequences of pulses on 1105 or 1107 will be decoded according to the BB84 protocol
3. Input waveguide 1101 and 1103 is coupled to waveguide section 1105 and output waveguide 1111 in a 2×2 coupler 1200
    Input waveguides 1101 is coupled to output waveguides 1105 and 1111 in a 2×2 coupler 1200
    Output waveguide 1111 connected to input waveguide 1201 such that incoming sequences of pulses on 1101 or 1103 will be decoded according to the RFI protocol if the AMZI settings are those of the BB84 protocol or according to the COW protocol if the AMZI settings are identical
4. The Output waveguides of the output interface are connected to further integrated photodetectors or further integrated light output couplers 202.

Figure 9:
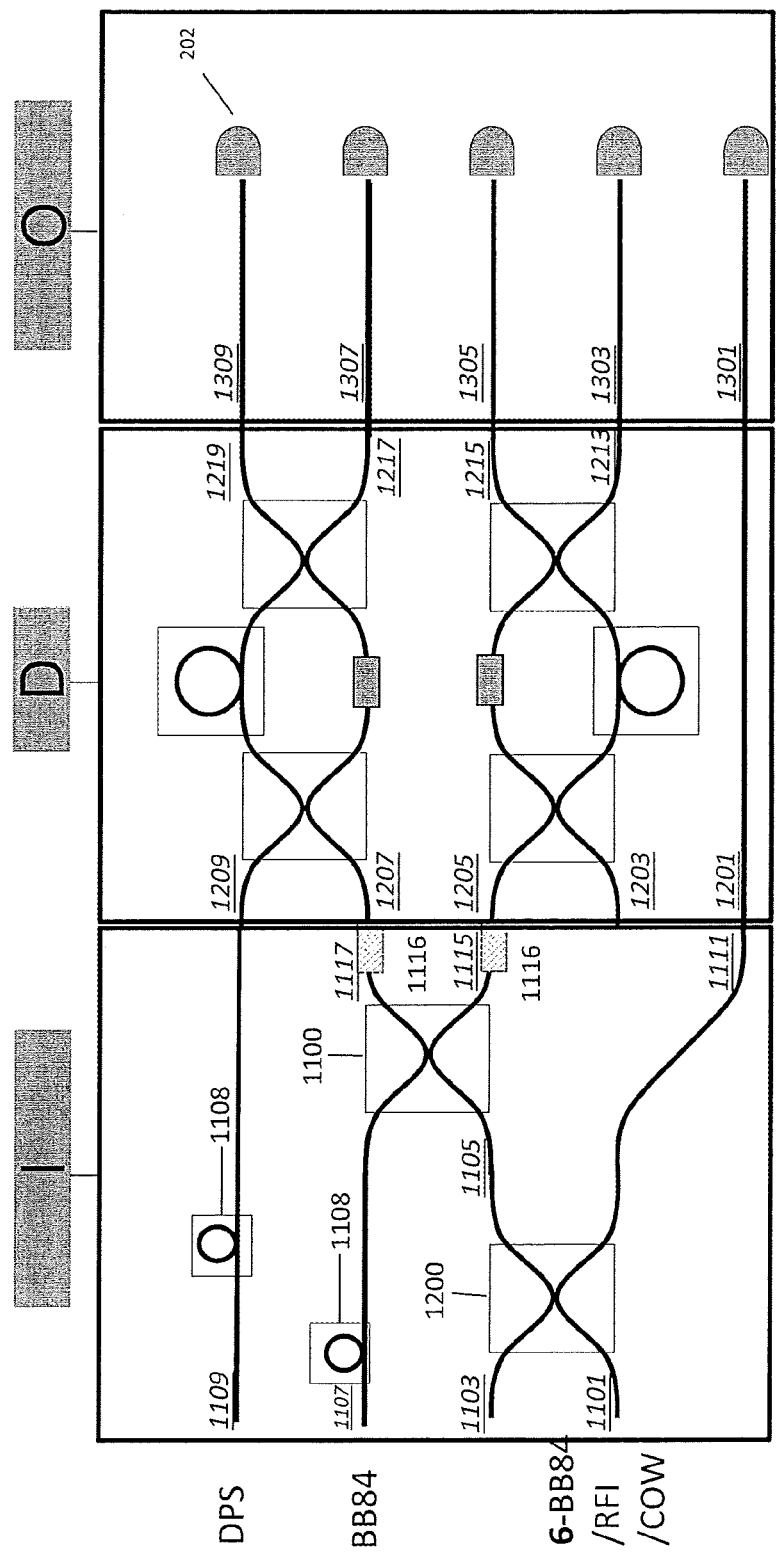
FIG. 9 shows a variation on the component of FIG. 8.

The embodiment of FIG. 8 can also be adapted for time division multiplexing as shown in FIG. 9. To avoid any unnecessary repetition, like reference numerals will be used to denote like features. In FIG. 9, the input interface
    comprises a further short delay lines 1108 (e.g. half the delay of line 313 of FIG. 4) on one of multiple waveguides of the interface to time multiplex the protocol execution
Operation
The short delay line 1108 on 1105 allows to time-offset the execution of the BB84 protocol with respect to the execution of the DPS and COW protocols In FIG. 10, the interface comprises:
1. Three input waveguides 1103, 1107 and 1109
2. One straight waveguide 1109 is used to send incoming pulses to a single input of an AMZI in the parallel decoder section for decoding according to the DPS protocol
3. One 1×2 optical coupler 1098 used to split incoming pulses in one of the input waveguide 1103 into two output waveguides 1105, 1111, one waveguide 1111 connected to one input waveguide 1201 of an AMZIs of the parallel decoder section one waveguide 1105 connected to a 2×2 optical coupler 1100 with two output waveguides 1115, 1117, one waveguide 1115 connected to a time decoding line 1205 and one waveguide 1117 connected to one input of a further AMZI of the parallel decoder section. This configuration allows for decoding an incoming sequence of pulses according to the RFI protocol
4. The 2×2 optical coupler 1100 is used to split incoming pulses into two output waveguides 1115, 1117, one waveguide 1115 connected to a time decoding line 1205 and one waveguide 1117 connected to one input of a further AMZI of the parallel decoder section for decoding according to the COW protocol
5. The input interface can comprise at least one further phase modulator 1116 on one or both output optical waveguide 1115, 1117 to stabilize the phase difference between both AMZIs.
6. The 2×2 coupler 1100 may have an optical splitting ratio of 50:50 or any arbitrary ratio able to create an imbalance in the intensities of the pulses in the arms 1115 and 1117 for optimal operation of the decoding protocols.

7. The 1×2 coupler 1098 may have an optical splitting ratio of 50:50 or any arbitrary ratio able to create an imbalance in the intensities of the pulses in 1111 and 1105 for optimal operation of the decoding protocols.

Figure 10:
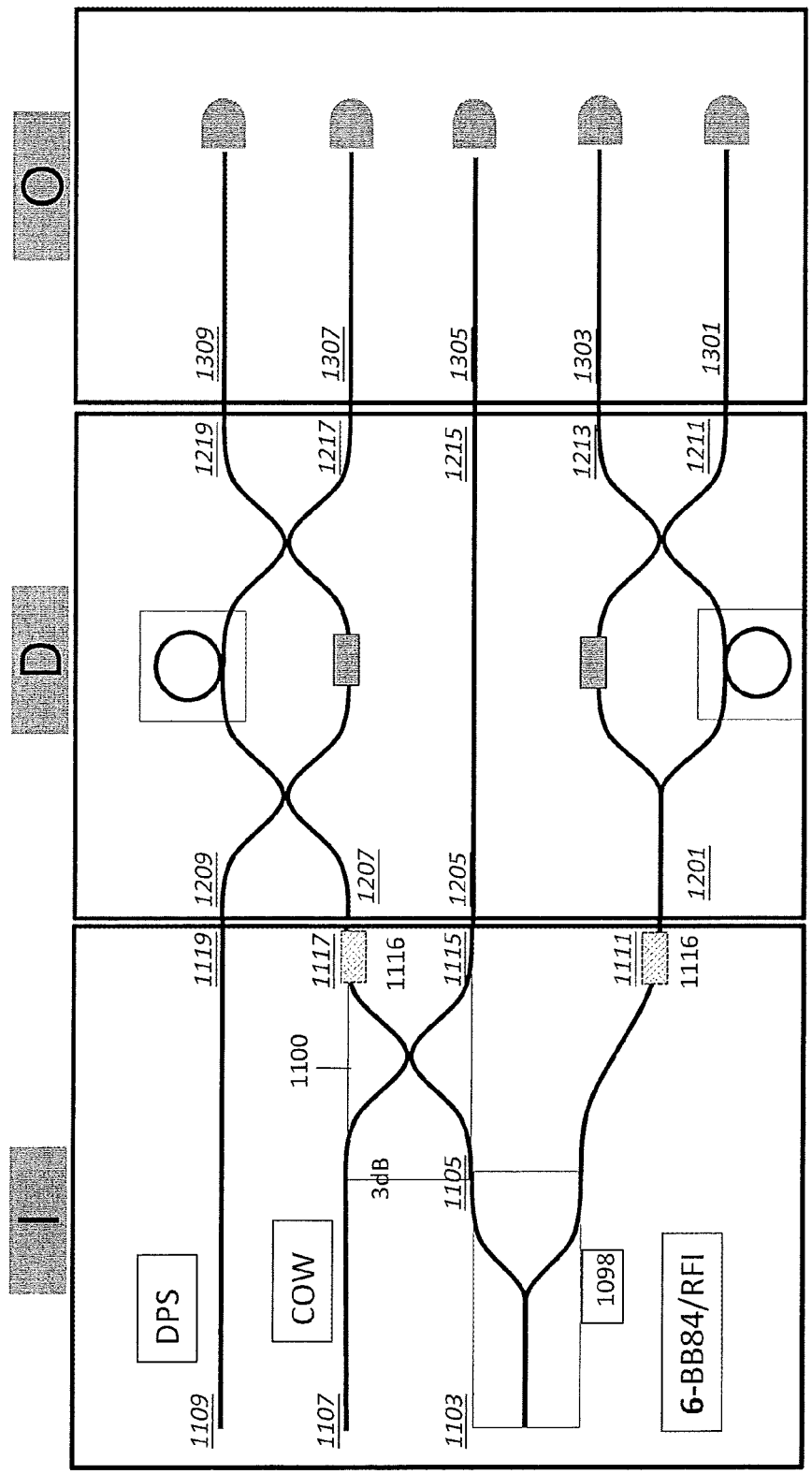
FIG. 10 shows a variation on the component of FIG. 8.

In FIG. 10 the interface operates as follows:
1. Input waveguide 1109 is connected to input waveguide 1209 such that an incoming sequence of pulses on 1109 will further be decoded according to the DPS protocol
2. Input waveguide 1107 is coupled to output waveguides 1117 and 1115 in a 2×2 coupler
    Output waveguide 1117 is connected to input waveguide 1207 and output waveguide 1115 connected to input waveguide 1205 such that incoming sequences of pulses on 1107 will be decoded according to the COW protocol
3. Input waveguide 1103 is coupled to output waveguides 1105 and 1111 in a 1×2 coupler
    waveguide 1105 is coupled to output waveguides 1115 and 1117 in a 2×2 coupler 1100
    Output waveguide 1111 connected to input waveguide 1201 such that incoming sequences of pulses on 1103 will be decoded according to the RFI protocol
4. Output waveguides 1309, 1307, 1305, 1303, 1301 of the output interface are connected to integrated photodetectors or integrated light output couplers In FIG. 11 the interface comprises:
1. Two input waveguides 1101, 1103.
2. One straight waveguide 1101 is used to send incoming pulses to a single input of an AMZI in the parallel decoder section for decoding according to the DPS protocol
3. One 1×3 optical coupler 600 used to split incoming pulses in one of the input waveguide into three output waveguides 1501, 1503 and 1505. Waveguides 1501 and 1505 are each connected to one input waveguide of a distinct AMZIs of the parallel decoder section for decoding according to the RFI protocol. The other waveguide 1503 is connected to a time-bin decoding line 1205.
4. The input interface can comprise at least one further phase modulator (106*p*) on one or both output optical waveguide 1501 and 1505 to stabilize the phase difference between both AMZIs.

Figure 11:
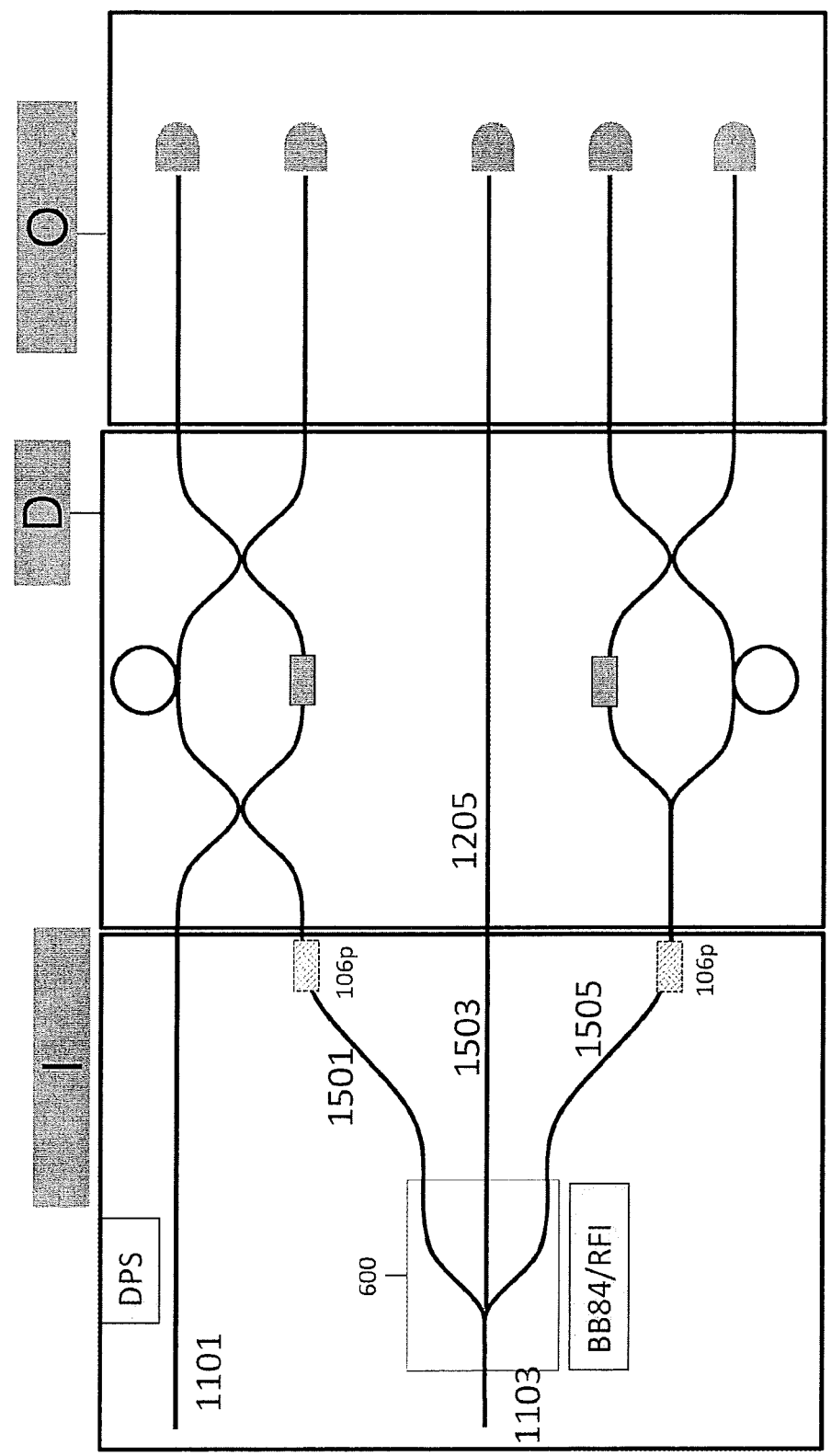
FIG. 11 is a schematic of a component in accordance with an embodiment adapted to perform the DPS, BB84 and RFI protocols.
Figure 12:
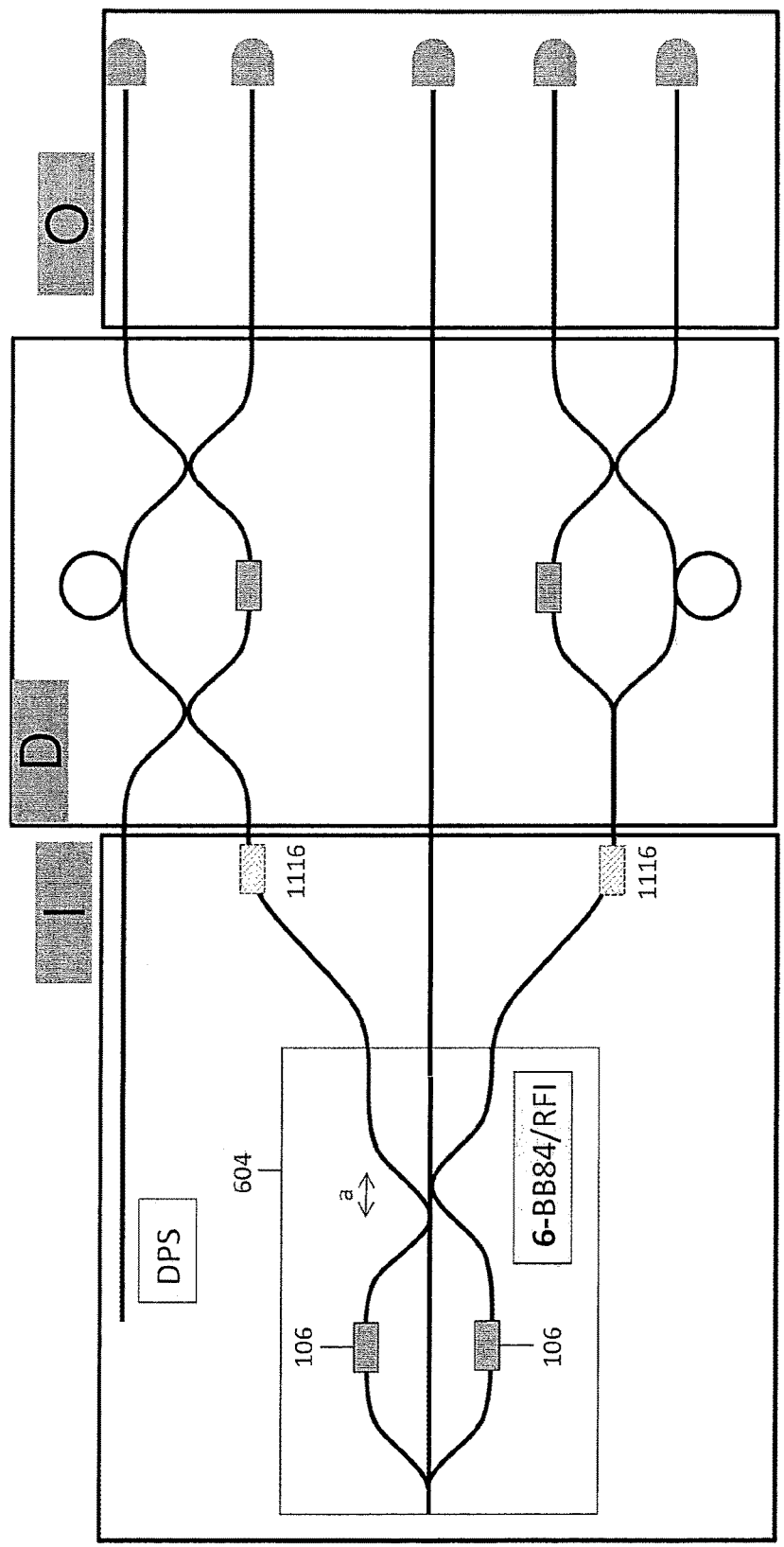
FIG. 12 shows a variation on the component of FIG. 11.

In FIG. 12 the interface is similar to the input interface described with reference to FIG. 11. However, the 1×3 coupler 600 of FIG. 11 is replaced by a reconfigurable 1×3 optical coupler 604. With such an arrangement of coupler and a TOM phase modulation, one can split the incoming pulses along 1, 2, or 3 waveguides and therefore choose what protocol to implement. In this case, one could maybe run only one or two different protocols at the same time, but using time and/or wavelength multiplexing one could still run several protocols in parallel.

Figure 13:
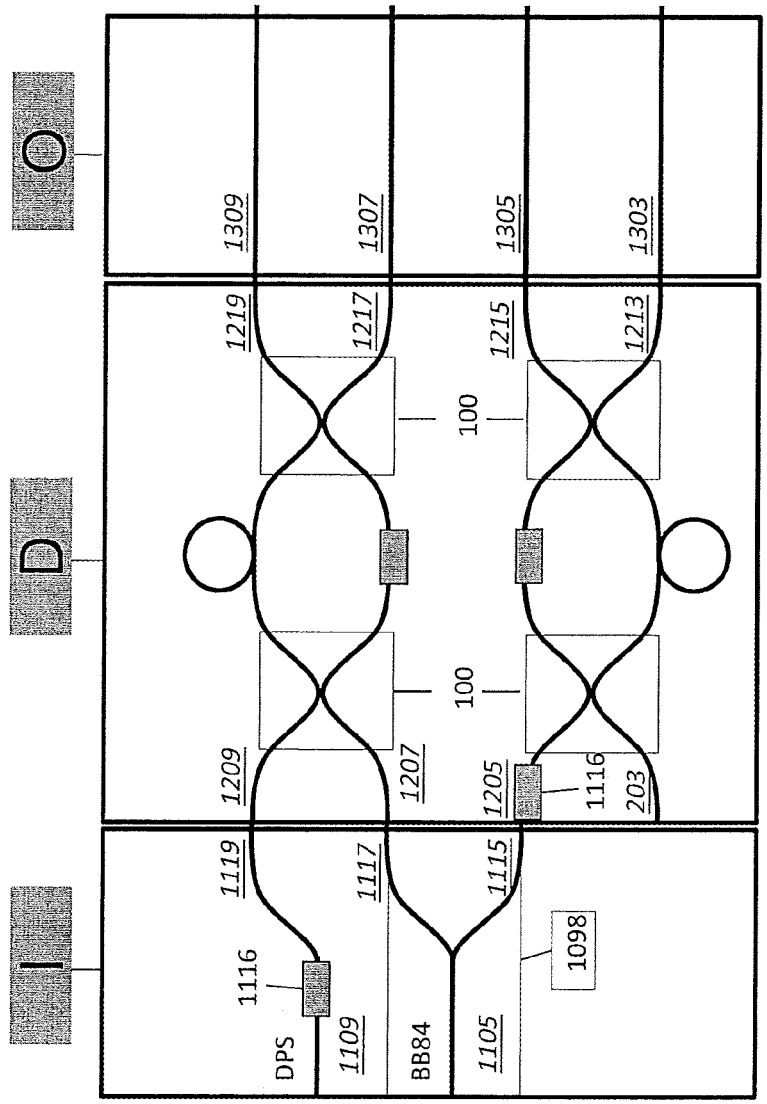
FIG. 13 is a schematic of a component in accordance with an embodiment adapted to perform the DPS and BB84 protocols.

In FIG. 13 the parallel decoder comprises 2 AMZIs. In this embodiment, the only path for photons through the decoder is via one of the two AMZIs. The AMZIs are identical to those described with reference to FIG. 4 and to avoid unnecessary repetition, like reference numerals will be used to denote like features.

The interface comprises:
1. Two input waveguides 1105 and 1109
2. One waveguide 1109 is used to send incoming pulses to a single input of an AMZI in the parallel decoder section for decoding according to the DPS protocol
3. One 1×2 optical coupler 1098 used to split incoming pulses in one of the input waveguides 1105 into two output waveguides 1115, 1117, each connected to one input waveguide 1205, 1270 of a distinct AMZI of the parallel decoder section for decoding according to the BB84 protocol
4. The input interface comprises at least one further phase modulator 1116 on one or both output optical waveguides 1115, 1117 to stabilize the phase difference between both AMZIs.
5. The input interface comprises at least one further phase modulator 1116 on 1105 to control the output at the first coupler of the AMZI
6. The optical coupler 1098 and may have an optical splitting ratio of 50:50 or any arbitrary ratio able to create an imbalance in the intensities of the pulses in the arms 1115 and 1117 for optimal operation of the decoding protocols.

In FIG. 13 the interface operates as follows:
1. Input waveguide 1109 is connected to input waveguide 1209 such that an incoming sequence of pulses on 1109 will further be decoded according to the DPS protocol
2. Input waveguide 1105 is coupled to output waveguides 1117 and 1115 in a 1×2 coupler
    Output waveguide 1117 is connected to input waveguide 1207 and output waveguide 1115 connected to input waveguide 1205 such that incoming sequences of pulses on 1105 will be decoded according to the BB84 protocol
3. FIG. 13 also shows a multiple output interface. The output interface (O) is a section of the integrated optical waveguide comprising one waveguide 1303, 1305, 1307 and 1309 for each AMZI output waveguide of the parallel decoder section.

Figure 14:
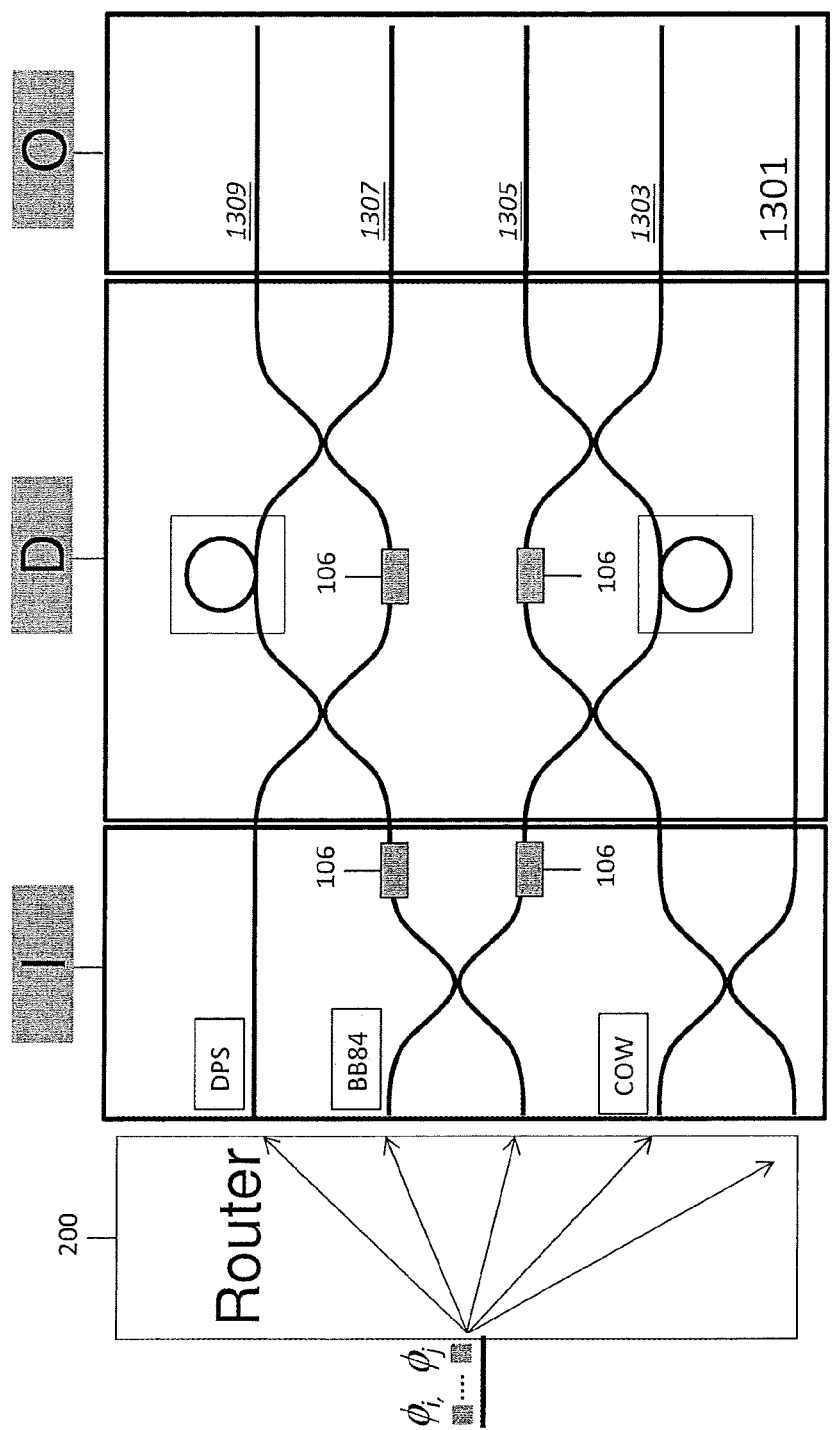
FIG. 14 is a schematic of a component in accordance with an embodiment having a router.

FIG. 14 shows a variation of the component of FIG. 5. The input interface, the decoder and the output interface are the same as those described with reference to FIG. 5. However, the component also comprises a router. An arrangement of a plurality of coupled tuneable couplers and waveguides can be designed to perform the routing operation. Any arrangement of such a plurality of tuneable couplers and waveguides in the purpose of directing incoming light to an input interface will constitute a router. In this case, the assembly of the router and the input interface can be referred to in a more general way as a routing interface.

The router directs the incoming pulses to the different input waveguides 1101, 1103, 1105, 1107 and 1109 of the Interface for decoding according to specific protocols. The router is on or off chip.

In an embodiment, the router may comprise:
0 Patch panel
1 MEMS switch
2 Array of tuneable couplers
3 AWG On certain platforms compatible with MEMS actuation, the routing can be done using MEMS switches. The router may also comprise an AWG demultiplexer to route light to the different protocol inputs according of the wavelength of the pulse sequence.

Figure 15:
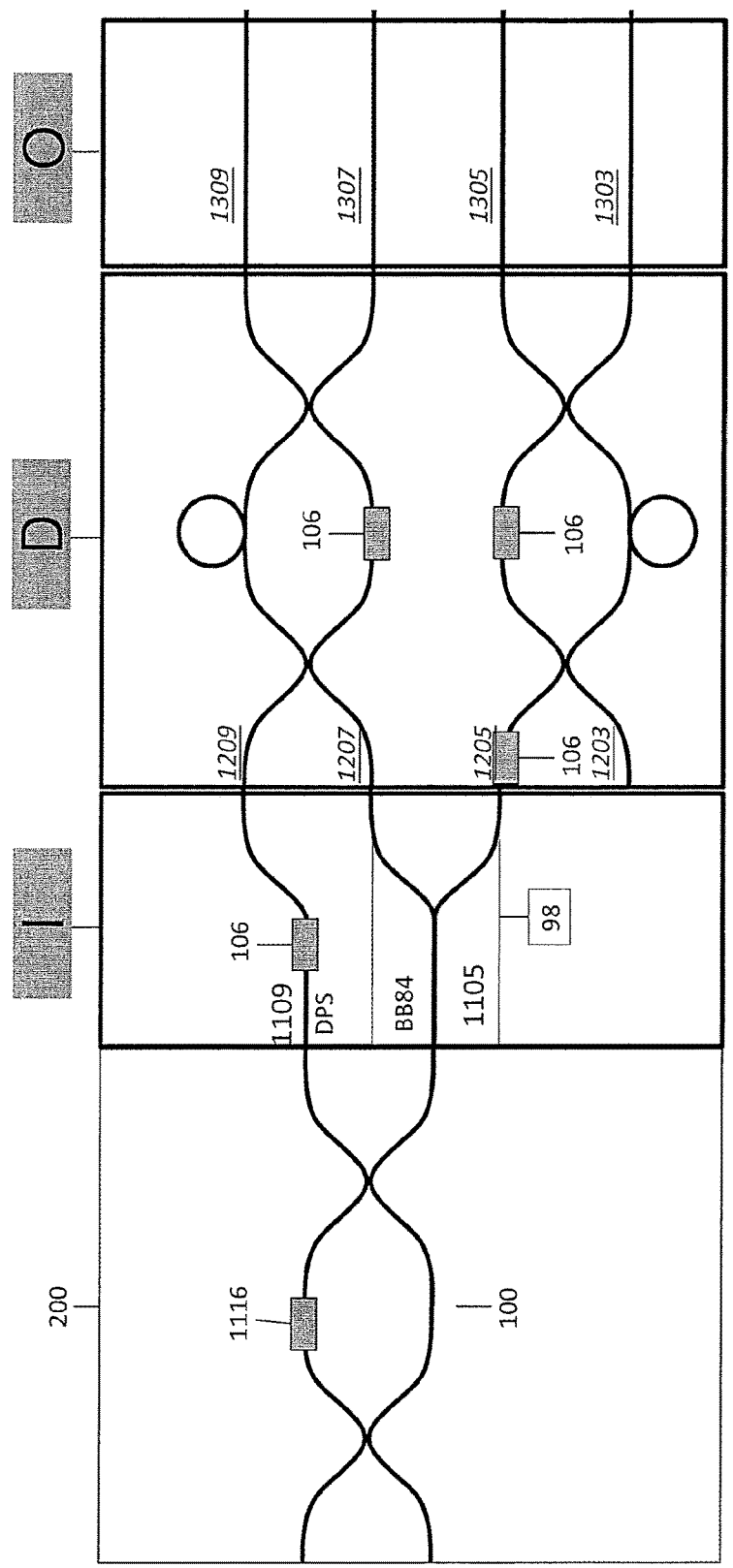
FIG. 15 is a schematic showing an implementation of a router section.

FIG. 15 shows a variation of the component of FIG. 13. The input interface, the decoder and the output interface are the same as those described with reference to FIG. 5. However, the component also comprises a router. The router comprises one balanced MZI 100 with a phase modulator 1116 on one arm in order to control the input in each waveguide of (I)
    100% in 1109→DPS protocol
    100% in 1105→BB84 protocol 1:3 in 109 and 2:3 in 105 with the phase modulator 1109 configured to set a PI phase shift between the pulses incoming on 1209 and the pulses incoming on 1207→COW protocol DPS, COW, BB84 there is no time-bin decoder but an input interferometer is provided to reconfigure the circuit such that the top interferometer can act as a time line.

Figure 16:
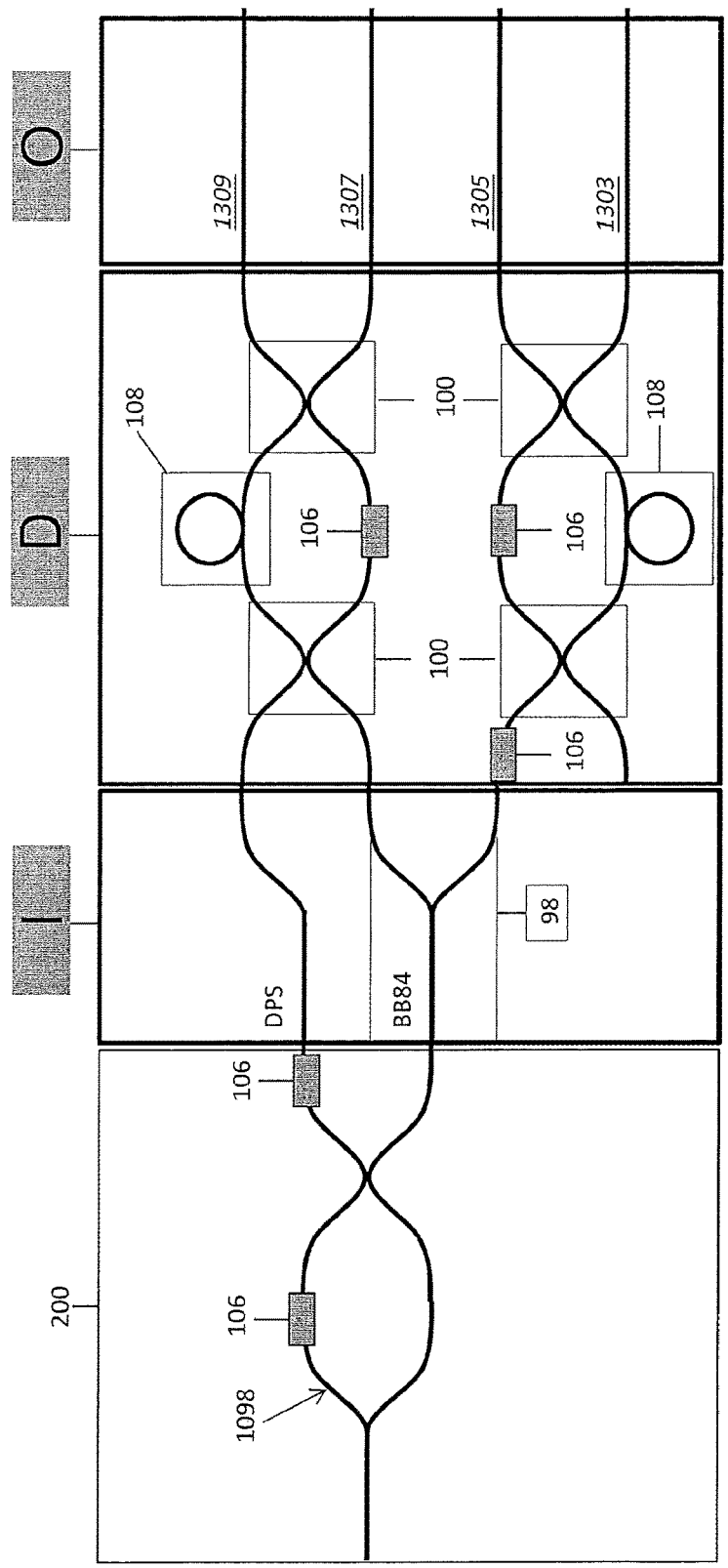
FIG. 16 shows a variation of the router section of FIG. 15.

FIG. 16 is variation on the component of FIG. 15. In FIG. 16, the input interface, decoder and output interface are the same as those described with reference to FIG. 15. However, in the router, the MZI 100 is replaced by 1×2 coupler 1098.

Figure 17:
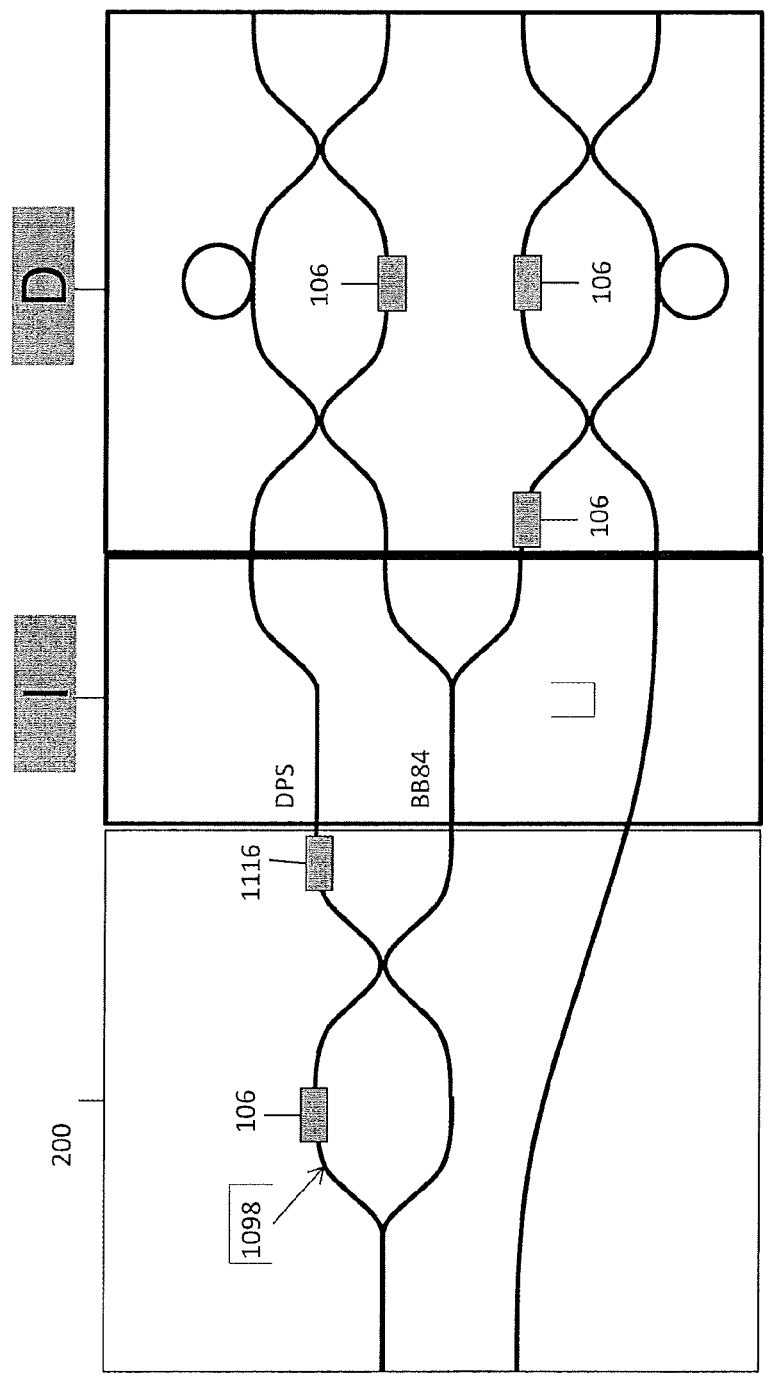
FIG. 17 shows a variation of the router section of FIG. 16.

FIG. 17 shows a variation on the component of FIG. 16. Here, the input interface comprises a further waveguide 1101 that connects to a waveguide of the second AMZI for direct DPS. This arrangement may allow for lower losses along the waveguide.

Figure 18:
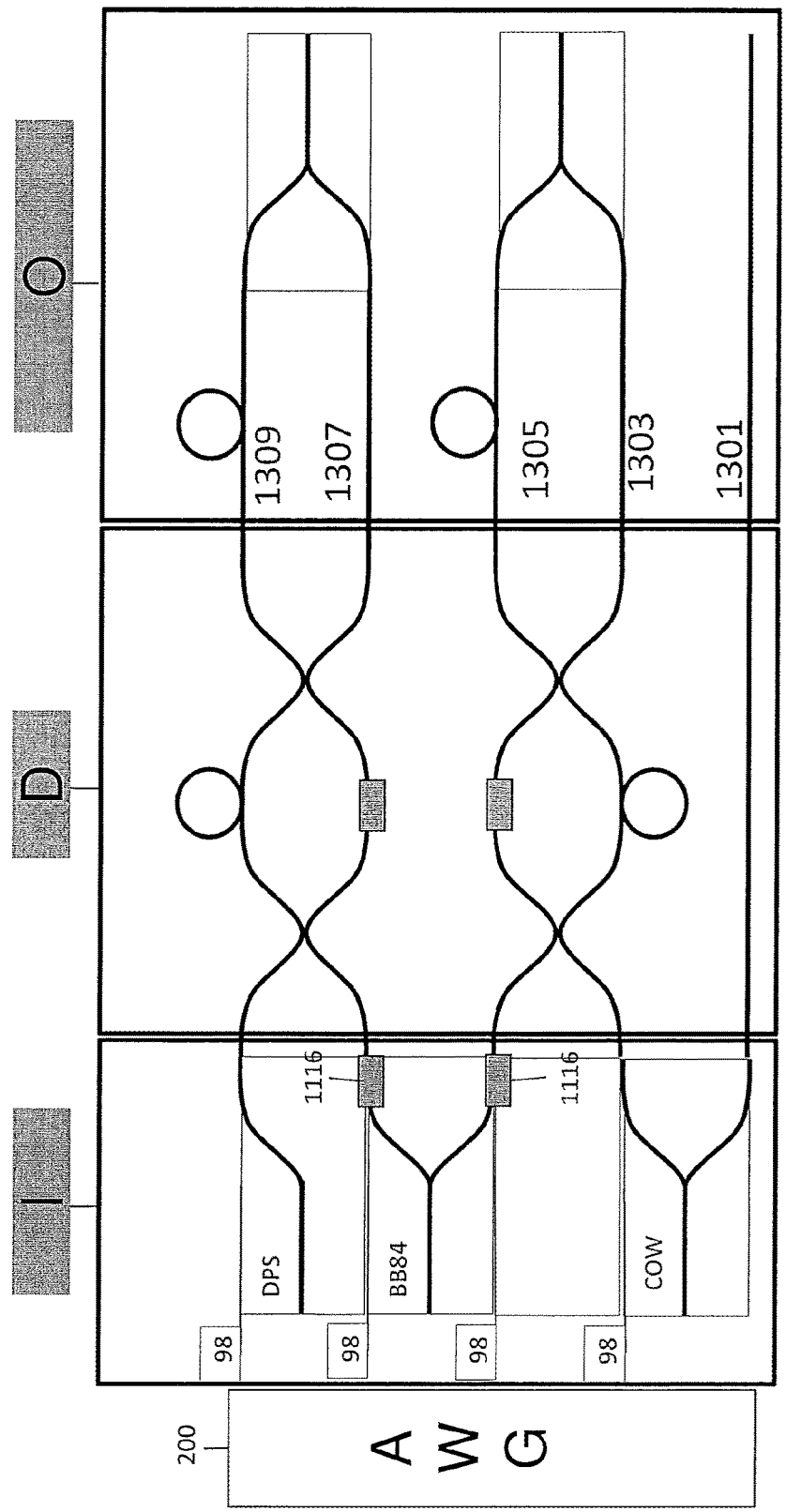
FIG. 18 is a schematic showing an implementation of an output section

FIG. 18 shows a component with a route with an AWG demultiplexer. The input interface and the decoder section are the same as those described with reference to FIG. 5. However, the output section comprises delay lines for time division multiplexing of the decoded signal. Each pair of waveguides 1309, 1307 and 1305, 1303 in the output section carries the output from each of the interferometers is considered as a pair of outputs. In this embodiment, there is a first output pair 1307, 1309 and a second output pair, 1303, 1305. One of the output waveguide 1309, 1305 of each output comprises a delay loop so that the length of one of the waveguides in each pair is longer than the length of the other waveguide.

The outputs of the first and second pairs of waveguides, 1309 1307 and 1305, 1303 are combined at first 2×1 output coupler and second 2×1 output coupler respectively. The output of the first pair of waveguides is combined into waveguide 1308 and the output of the second pair of waveguides is combined into waveguide 1304. Due to the delay loop in each pair of waveguides, the output from the waveguide with the delay loop is delayed compared to the other waveguide of the pair. Therefore, the output from each waveguide in a pair is separated in time and can therefore be output by a single waveguide. If the 3 dB cost is acceptable, this allows for a reduction of the number of detectors. When combining two waveguides in a 2×1 coupler, only 50% of the input light is coupled to the output. There is therefore an extra loss, but depending of the losses in the rest of the chip, this 3 dB loss can still be acceptable for the user

FIG. 19

In a potential application a CWDM will be used to select the protocols and a DWDM grid to increase the bandwidth Multiplexing can be used at both input and output. For example: Alice 1 to 4 send information according to different protocols using 4 different optical bands in the Coarse Wavelength Division Multiplexing grid (20 nm spacing between the channels). DPS will be used for wavelengths in Band 1511, BB84 for Band 1531 and COW for Band 1551. Now each Alice can also use Dense Wavelength Division Multiplexing (0.2 nm spacing between the channels) to send signals at various wavelengths and operate the same protocol in parallel. The receiver BOB would therefore need Demultiplexing of the CWDM grid at the Router and demultiplexing of the DWDM at the output of each output waveguide.

Figure 19:
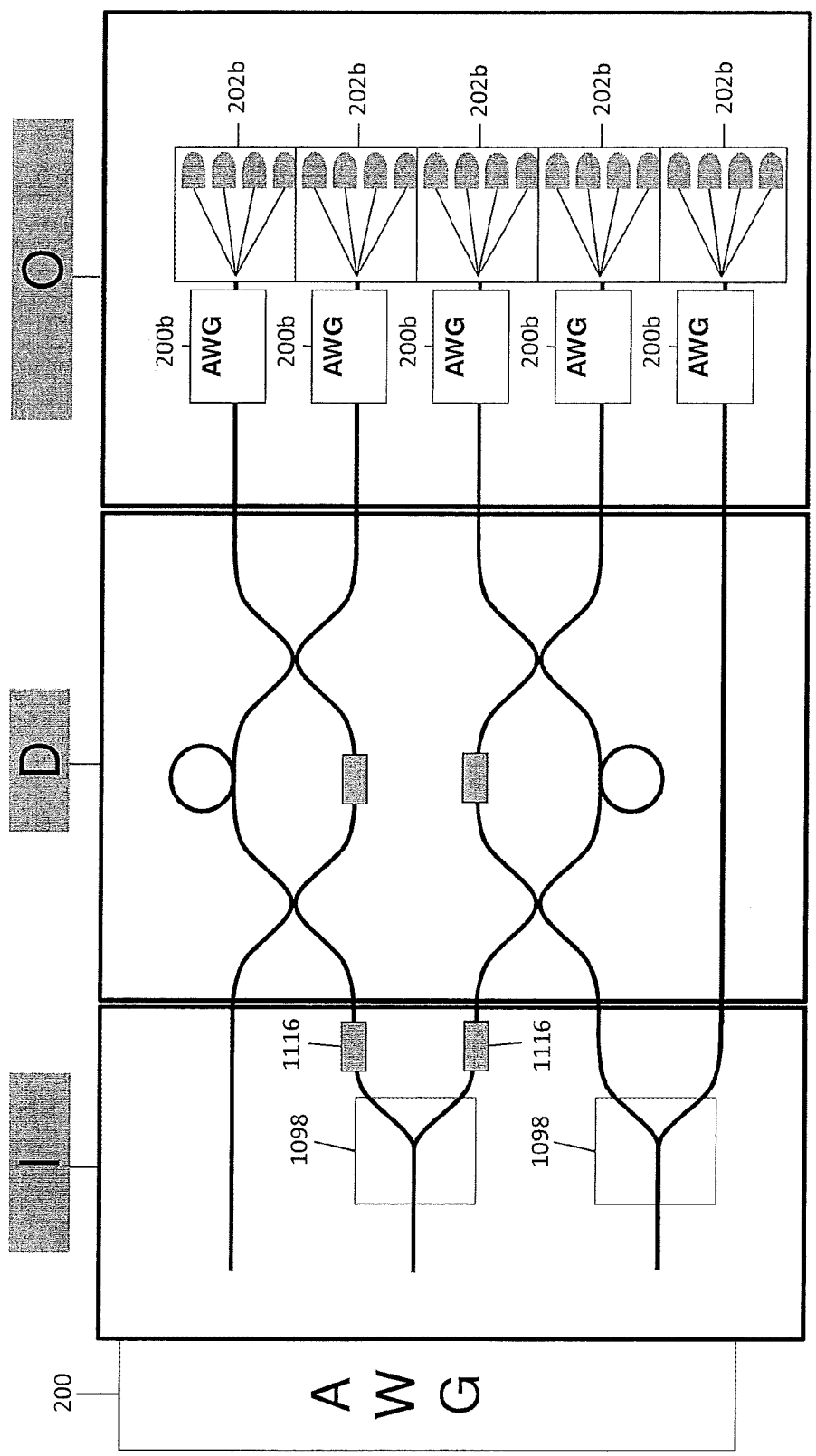
FIG. 19 shows a variation of the output section of FIG. 18.

FIG. 19 shows a variation on the component of FIG. 18. The router, input interface and decoder are the same as described with reference to FIG. 18. In the output interface of FIG. 19, each output waveguide of the output interface comprises an AWG demultiplexer and further waveguides leading to the detectors or output coupler component.

For various reasons it is convenient to have control over the losses in each arm of the circuit. As an example, a security reason requires to balance the photon detection probability in each basis. As another example, the detectors used to measure the photons can have different detection efficiencies which can be compensated for by the chip. To these ends the waveguides of the output section of the chip can further be enhanced by introducing imbalanced couplers or tuneable coupler.

Several building block configurations are equivalent and therefore the circuit drawn here include all possible equivalent circuits based on interchanging some building blocks with some others.

Interchangeability of Building Blocks

For example:

A single waveguide can be equivalently replaced by a 1×2 coupler in order to have an additional control of the losses between different channels.

A 1×2 coupler 98 can be equivalently replaced by a 2×2 coupler 100

A 2×2 coupler 100 can be equivalently replaced by a tuneable MZI assembly (2×100 and 1×106 or 2×106 in the interferometer arms)

Time multiplexing delay lines can be equivalently combined with input/output waveguides of 1×2 coupler or 2×2 couplers Any circuit with modified location of the delay lines and phase modulators and realizing the same operation as the drawn circuits are equivalent to the drawn circuits.

Any circuit that can be reduced to the drawn circuits, without loss of generality or functionality is equivalent to the drawn circuits.

On an active platform, 2 AMZIs configured to orthogonal bases can be equivalently replaced by 1 single AMZI with a high-speed active modulator in one arm to select the decoding basis.

The above components can be fabricated by a number of different techniques, for example, using the process flow of FIG. 20. There are many possibilities for the fabrication system, for example: Silicon based: Si, SOI (silicon on insulator), SiN (silicon nitride), SiO$_2$ (silicon dioxide), SiON (silicon oxi-nitride—mixture) but also glasses, polymers, diamond, silicon carbide and other passive materials. The waveguides can be at the surface of a membrane (Si or SiN membrane on top of SiO$_2$ insulation), free standing (suspended Si waveguides in SOI wafers, or suspended SiN on SiN on Si wafers), or embedded in a cladding (e.g. SiN in a SiO$_2$ cladding, or SiON in a SiO$_2$ cladding)

In FIG. 20A, an Epi substrate 500 is provided, e.g. silicon substrate. Next, in FIG. 20B, a cladding material 503 is provided overlying and in contact with the Si substrate 500. In this example, the cladding material 503 is SiO2 and is grown via CVD deposition.

In FIG. 20C, waveguide material 505 is grown over the cladding material 503. In this example, the waveguide is formed via the deposition of waveguide material e.g. CVD deposition of SiN or SiON. In this example, the waveguide is patterned using electron beam lithography techniques. However, other techniques can be used such as photolithography+(plasma and/or chemical) etching, direct laser writing, ion exchange, nanoimprint etc. In FIG. 20D, a lithography resist 507 such as ZEP-520A is spun and baked onto the waveguide material 505. In FIG. 20E, the resist is patterned using an electron beam. Next, the patterned resist is developed and as shown in FIG. 20F using N-Amyl Acetate solution as developer and Methyl Isobutyl Ketone as a rinse solution.

Next, in FIG. 20G, the waveguide pattern is transferred to the waveguide material e.g using Inductively Coupled Plasma Reactive Ion etching. The residual resist is removed, e.g. using a solution of 1165 or Dimethylacetamide as shown in FIG. 20H. Over-cladding the waveguide material 507 with further cladding material 509 e.g additional CVD deposition of $SiO_2$ is shown in FIG. 20I. After the deposition of the further cladding material as shown in FIG. 20I, a metal layer 511 e.g. 5 nm Chrome and 150 nm of Gold is deposited e.g. using electron beam evaporation as shown in FIG. 20J.

Using a similar lithography steps as described with reference to FIGS. 20D to 20F, a pattern is defined for the metal contacts. A chemical etch e.g. nitric acid+hydrochloric acid and Chrome etchant can be used to transfer the pattern to the metal layer as shown in FIG. 20K.

FIG. 20L shows a top view of the patterned metal layer 511 on top of a waveguide 507 buried in the cladding layer. This type of pattern could be used to form an interferometer where the waveguides form two optical paths. In the figure, the top path is covered by electrode 511 that allows a current to be passed through the electrode. In turn, this causes the electrode to heat up which effects a phase change within the waveguide directly underneath the metal layer 511.

In a further embodiment a lift-off process is used to define the metal pattern as shown in FIGS. 20M to 20Q. First resist 521 is spun and baked on top of the cladding material and exposed with the material pattern as shown in FIG. 20M. This is similar to the process described above with reference to FIGS. 20D to 20F. The exposure is done at high dose in order to cause a slight under-etching as shown in FIG. 20N. When removing the resist the aperture 523 at the resist/cladding interface is wider than at the resist/air interface.

Metal 525 is deposited on top of the resist 521 and, inside the apertures 523, on top of the cladding material as shown in FIG. 20O.

The resist is removed together with the excess metal while only leaving the metal pattern in adhesion to the cladding material as shown in FIG. 20P. The top view as shown in FIG. 20Q is similar to that shown in FIG. 20L.

FIG. 20 has demonstrated one fabrication system where it is possible to fabricate waveguides and contacts overlying the waveguides. All of the structures described with relation to FIGS. 1 to 19 can be fabricated using waveguides with electrodes to vary the phase where required.

On a passive medium, the depth of the etch and the shape of the waveguide can be used to control losses from the waveguide the above method relates to the fabrication of a waveguide with a "filled" cross section where the cross section of the waveguide forms a solid 2D shape. However, other cross sections are possible, for example, those defined by one, two or more stripes of waveguide material. The above waveguide can be a so-called deep etched waveguide or a shallow etched waveguide. Deep etched waveguides are less lossy in passive material systems.

The above system has been described with reference to a passive material system. However, embodiments can be realized on both passive and active platforms.

In the above embodiments, different protocols are realized by combining the elements of the decoder section.

As a summary example:

BB84: the nth set of output of the input section is configured such that the incoming pulses are split between 2 AMZIs, and such that there is a well-defined relation between the relative intensity and phase of the pulses sent to each AMZI. For instance: the input section splits the incoming pulses between AMZI 1 and AMZI 2 in such a way that there is a pi/2 phase shift between the pulses entering AMZI 1 and the pulses entering AMZI 2. In addition, nth set of output of the input section is configured to split the incoming pulses with a well-defined intensity ratio that can differ from 1:1.

DPS: the nth set of output of the input section send light to 1 AMZI

COW the nth set of output of the input section is configured to split incoming pulses between one AMZI and one Time line with an intensity ratio that can differ from 1:1

RFI: the nth set of output of the input section is configured to split incoming pulses between two AMZIs and one Time Line in such a way that there is a pi/2 phase shift between the pulses entering each AMZI and that the intensity ratio between both AMZI and between the time line and the AMZI can differ from 1:1

The above embodiments provide:
QKD receiver with increased key rate capabilities
Low loss integrated QKD receiver
Compact parallel multi-protocol, multi-wavelength QKD receiver
The receiver can be used with different transmitters and enables the simultaneous execution of different QKD protocols.

Waveguides and interferometers are tailored to work at this specific wavelength, thus limiting the adaptability of the device to different wavelengths. In the above embodiments, the circuit is designed as a compact parallel assembly of a plurality of waveguides and interferometric light routing elements that facilitate the on-chip frequency multiplexing of the physical signals. Moreover, the wavelength division demultiplexer at the input of the receiver is a way to select a specific QKD protocol or to use multiple single photon detectors in parallel to increase the secure key rate.

The sequential architecture used in conventional QKD technology and in the prior art is based on a sequence of interferometers that need to be reconfigured every time a new protocol has to be executed. Reconfiguring the interferometers is typically a slow operation and this limits the key rate of the QKD system. In the above embodiments a parallel architecture is provided, which means that interferometers are always ready to accept the physical signals coming from the transmitter, irrespective of the QKD protocol considered.

Difference from Conventional Technology:

The above embodiments are based on photonics integration on-chip. This offers scalability, mass reproduction and allows for extended architecture complexity over the conventional technology.

The above embodiments identify a way to exploit photonic integration and a parallel architecture to configure a multi-channel system that facilitates the multiplexing of the physical signals and the simultaneous execution of a plurality of QKD protocols. In serial architecture, the incoming light is sent in a single channel of the receiver and subsequently split in a single detection system containing one time line and one AMZI. A series of MZI switches allow to reconfigure the circuit for different QKD protocols in a way that one and only one protocol can be realized at once. In the above embodiments, a parallel receiver architecture is provided comprising different inputs for different QKD protocols. Because of the parallel architecture, such QKD protocols can also be executed simultaneously.

The above embodiments are designed such that a single detector (BOB) can be communicating with different transmitters (ALICE) which are free to use different protocols and/or different wavelengths.

The above embodiments can be realized on both passive and active platforms because they does not require high speed reconfiguration. This is a significant difference because the invention is compatible with ultra-low loss platform, which is not the case of the prior art. The design of the prior art necessitates active phase modulators to be functional: in order to realize the BB84 protocol the basis have to be selected at high frequency (>1 GHz), which means that the circuit need to be reconfigurable at least at that speed: this is to date impossible on any existing passive platform. This is a considerable drawback of the prior art since the propagation losses on active platforms are at least one order of magnitude higher than on passive platforms. The more losses in the transmitter, the shorter the distance at which QKD can be securely realized.

While certain embodiments have been described, these embodiments have been presented by way of example only, and are not intended to limit the scope of the inventions. Indeed the novel method and component described herein may be embodied in a variety of other forms; furthermore, various omissions, substitutions and changes in the form of the method and controller described herein may be made without departing from the spirit of the inventions. The accompanying claims and their equivalents are intended to cover such forms of modifications as would fall within the scope and spirit of the inventions.

The invention claimed is:

1. A component for a quantum communication system, the component comprising:
   an input section and a decoder section,
   the input section comprising n waveguides, where n is an integer of at least 2,
   the decoder section comprising m decoders, where m is an integer of at least 2, each decoder comprising at least one waveguide,
   the input section and the decoder section being provided on a single substrate such that the waveguides are continuous and integrated between the input section and the decoder section,
   the waveguides of the input section and the decoder section being arranged such that light pulses enter the waveguides of the decoder section via the waveguides of the input section and the m decoders operate in parallel.

2. A component according to claim 1, the component further comprising an output section, the output section comprising p waveguides, where p is an integer of at least 2, the output section and the decoder section being provided on a single substrate such that the waveguides are continuous and integrated between the output section and the decoder section.

3. A component according to claim 2, the component further comprising a router section, the router section comprising q waveguides, where q is an integer of at least 2, the router section and the input section being provided on a single substrate such that the waveguides are continuous and integrated between the outer section and the input section.

4. A component according to claim 2, wherein the substrate is a passive material.

5. A component according to claim 2, wherein the substrate is selected from Si, SOI (silicon on insulator), SiN (silicon nitride), SiO2 (silicon dioxide), SiON (Silicon Oxynitride), glasses, polymers, diamond or silicon carbide.

6. A component according to claim 2, wherein at least one decoder of the decoding section comprises an asymmetric Mach-Zehnder Interferometer (AMZI), said AMZI comprising at least two of said waveguides.

7. A component according to claim 6, wherein the AMZI comprises a phase modulator.

8. A component according to claim 7, wherein the AMZI comprises an electrode provided over a part of one of the two of said waveguides comprised in the AMZI.

9. A component according to claim 2, wherein the decoder section comprises a first decoder and a second decoder out of the plurality of m decoders, the first decoder being adapted to decode using a first measurement basis and the second decoder being adapted to decode using a second measurement basis, different from the first measurement basis, the waveguides of the input section being configured to randomly direct photons to the first decoder or the second decoder using a passive switching arrangement.

10. A component according to claim 9, wherein the passive switching arrangement comprises a coupler with a least two outputs, the coupler being a passive coupler whereby a photon entering the coupler randomly exits the coupler through one of the at least two outputs.

11. A component according to claim 2, wherein the parallel decoding is adapted to provide parallel decoding using at least two protocols.

12. A component according to claim 11, wherein the protocols are selected from BB84, B92, COW, DPS, RFI and 6 state BB84.

13. A component according to claim 11, wherein each decoder comprises a plurality elements, said elements comprising said waveguides and wherein different protocols are realised by combining different elements from different decoders.

14. A component according to claim 2, wherein the input section is adapted to direct light pulses into two or more decoders.

15. A component according to claim 14, wherein the input section comprises a wavelength division multiplexer adapted to send the input light pulses to different decoders depending on the wavelengths of the light pulses.

16. A component according to claim 2, wherein the output section comprises detectors.

17. A receiver for a quantum communication system, the receiver comprising a component according to claim 2.

18. A quantum communication system comprising an emitter and a receiver according to claim 17.

19. A method of fabricating a component, said method comprising:
   providing a substrate;
   forming a cladding layer on said substrate;
   forming a waveguide layer on said cladding layer;
   patterning said waveguide layer; and
   forming a cladding layer overlying said waveguide layer, wherein patterning said waveguide layer comprises:
      patterning an input section and a decoder section to form a plurality of waveguides,
         the input section comprising comprises n waveguides, where n is an integer of at least 2,
         the decoder section comprising m decoders, where m is an integer of at least 2, each decoder comprising at least one waveguide,
         the input section and the decoder section being provided on the said substrate such that the waveguides are continuous and integrated between the input section and the decoder section,
         the waveguides of the input section and the decoder section being arranged such that light pulses enter the waveguides of the decoder section via the waveguides of the input section and the m decoders operate in parallel.

\* \* \* \* \*